(12) United States Patent
Runkel

(10) Patent No.: US 7,392,998 B2
(45) Date of Patent: Jul. 1, 2008

(54) SUSPENSION DEVICE FOR MOTOR VEHICLES

(75) Inventor: Walter Runkel, Leubsdorf/Rhein (DE)

(73) Assignee: Hemscheidt Fahrwerktechnik GmbH & Co. KG, Hann-Gruiten (DE)

(*) Notice: Subject to any disclaimer, the term of this patent is extended or adjusted under 35 U.S.C. 154(b) by 283 days.

(21) Appl. No.: 10/517,807

(22) PCT Filed: May 16, 2003

(86) PCT No.: PCT/EP03/05142

§ 371 (c)(1),
(2), (4) Date: Oct. 17, 2005

(87) PCT Pub. No.: WO03/106202

PCT Pub. Date: Dec. 24, 2003

(65) Prior Publication Data
US 2006/0208446 A1  Sep. 21, 2006

(30) Foreign Application Priority Data
Jun. 12, 2002 (DE) .................. 202 09 120 U

(51) Int. Cl.
B60G 9/04 (2006.01)
(52) U.S. Cl. .................. 280/124.157; 280/124.128; 280/124.158; 280/124.159
(58) Field of Classification Search ............. 280/124.1, 280/124.111, 124.112, 124.121, 124.128, 280/124.158, 124.157, 124.159
See application file for complete search history.

(56) References Cited

U.S. PATENT DOCUMENTS

| 1,290,293 | A |   | 1/1919  | Morski    |         |
|-----------|---|---|---------|-----------|---------|
| 2,706,009 | A | * | 4/1955  | Schramm   | 180/41  |
| 3,085,796 | A |   | 4/1963  | Wettstein |         |
| 3,689,103 | A | * | 9/1972  | Meulendyk | 280/5.513 |
| 3,921,746 | A | * | 11/1975 | Lewus     | 180/165 |
| 6,142,495 | A | * | 11/2000 | Kim       | 280/124.111 |
| 6,161,853 | A | * | 12/2000 | Jung      | 280/124.136 |

FOREIGN PATENT DOCUMENTS

EP  0 980 772  2/2000

* cited by examiner

*Primary Examiner*—Toan To
(74) *Attorney, Agent, or Firm*—Brinks Hofer Gilson & Lione

(57) ABSTRACT

The present invention relates to a suspension device for the load-bearing and resilient support of a wheel in a motor vehicle, comprising at least one spring cylinder with a piston, which is guided in a manner moveable relative to it in a pressure cylinder, and comprising a driving device for converting pivoting movements of a wheel oscillating-crank supporting arm, which movements oscillate about an oscillating-crank axis, into the relative movements between the pressure cylinder and piston, the piston acting counter to an elastically compressible spring medium (FM) in order to produce a load-bearing supporting spring force (F), the driving device being designed as a gearwheel mechanism.

25 Claims, 25 Drawing Sheets

SUSPENSION DEVICE FOR MOTOR VEHICLES

CROSS REFERENCE TO RELATED APPLICATION

This application claims priority to PCT/EP03/05142, filed May 16, 2003, and DE 202 09 120.1, filed Jun. 12, 2002.

BACKGROUND OF THE INVENTION

The present invention relates to a suspension device for the load-bearing and resilient support of a wheel of a motor vehicle. The device comprises at least one spring cylinder with a piston, which is guided in a manner moveable relative to it in a pressure cylinder, and comprising a driving device for converting pivoting movements of a wheel oscillating-crank supporting arm, which movements oscillate about an oscillating-crank axis parallel to a wheel axis, into relative movement between the pressure cylinder and piston. The piston acts counter to an elastic compressible spring medium in order to produce a load-bearing supporting spring force.

Suspension devices of the general type of this invention are used primarily in heavier wheeled and caterpillar-type motor vehicles. In this case, each load-bearing vehicle wheel has a dedicated suspension which is independent of the other wheels, having a dedicated suspension device having a spring cylinder which, by interaction with a hydropneumatic spring energy store, produces the supporting spring force for the particular wheel. The wheel is mounted at a free end of a wheel oscillating-crank supporting arm. A shaft is connected to the supporting arm acting counter to the spring cylinder or to the piston thereof via a driving device.

In the case of a known suspension device of the type described previously, the driving device is designed in the manner of a connecting-rod drive, an eccentric lever, which, for its part, is connected in an articulated manner to a connecting rod coupled to the piston of the spring cylinder being connected to the shaft. A connecting-rod drive of this type has the disadvantage here of the transmission of force not being linear, but rather changing in accordance with a sine function because of the pivoting movement of the eccentric lever. Unfavorable lever ratios therefore arise in such a manner that, on the one hand, the supporting force can be achieved only by means of a relatively great pressure, and, on the other hand, it is possible to achieve only a relatively small spring travel (spring stroke) which is often insufficient especially for off-road vehicles. Furthermore, in the case of known suspension devices, a damping device for damping the suspension movements is provided by a hydraulic medium, which acts counter to the compressible (pneumatic) medium in order to produce the supporting spring force, flowing through a damping valve but, as a result, disadvantageously being rapidly heated because of the throttle action. This heating also has an effect on the compressible (pneumatic) medium by the pressure thereof, and therefore also the supporting spring force increasing. For the reasons mentioned, the known suspension device suffers from unfavorable, inconstant suspension and damping properties.

Furthermore, suspension devices of other types are also known with the supporting arm being connected in a rotationally fixed manner to a mechanical torsion bar spring which produces the supporting spring force. Systems of this type require a very large amount of installation space, since for each wheel a separate torsion bar spring extends transversely across the entire vehicle to the opposite side and has to be fastened therein in a rotationally fixed manner. In addition, mechanical friction dampers are also provided in mechanical suspension devices of this type.

The present invention is based on the object of providing a suspension device of the generic type described above, which is distinguished by great performance and improved suspension properties and, in particular, improved damping properties while having a compact constructional form.

SUMMARY OF THE INVENTION

An object of this invention is achieved by the driving device being designed according to the invention as a gearwheel mechanism. In this case, the gearwheel mechanism comprises a gearwheel element, which is connected or can be connected to the oscillation-crank supporting arm, is mounted in a rotating manner about the oscillating-crank axis and has at least a partial peripheral gear sector and a rack element which is connected to the piston (in the case of a pressure cylinder arranged in a fixed position) or to the pressure cylinder (in the case of a piston supported in a fixed position). The gearwheel mechanism according to the invention advantageously achieves a constantly linear transmission of force, it also being possible for large spring travels to be realized without any problem.

Another object of this invention is achieved by a damping device for damping the suspension movements having a separate circuit of a hydraulic damping medium, which circuit is independent of the spring cylinder and the spring medium. For this purpose, the damping device has at least one separate damper cylinder with a damper piston, which is guided in a cylinder in a manner moveable relative to it, and at least one damping valve, which is connected hydraulically to the damper cylinder. The damping device expediently interacts here with the same driving device as the spring cylinder, but the media are advantageously entirely separated from each other, with the result that there is also no thermal dependency. Heating of the damping medium is therefore not critical because the temperature of the spring medium, and therefore also the supporting spring force, remains unaffected thereby. The damping device is expediently driven by the same gearwheel element, for which purpose a separate rack element can be connected to the damper piston (in the case of a positionally fixed support of the cylinder) or to the cylinder (in the case of a positionally fixed support of the damper piston). The two rack elements of the spring cylinder and of the damper cylinder can advantageously be arranged essentially parallel to each other on diametrically opposite sides of the gearwheel element and are in engagement with the latter. This results in an H-shaped arrangement of the gearwheel and rack elements. However, as an alternative to this, just one common rack element may also be provided, the spring cylinder being arranged on one side and the damper cylinder being arranged on the other side.

Further advantageous refinements of the invention are contained in the dependent claims and in the following description.

BRIEF DESCRIPTION OF THE DRAWINGS

The invention will be explained in more precise detail with reference to a number of exemplary embodiments which are illustrated in the drawing, in which, in each case in schematic basic illustrations.

DETAILED DESCRIPTION OF THE INVENTION

Figure 1:
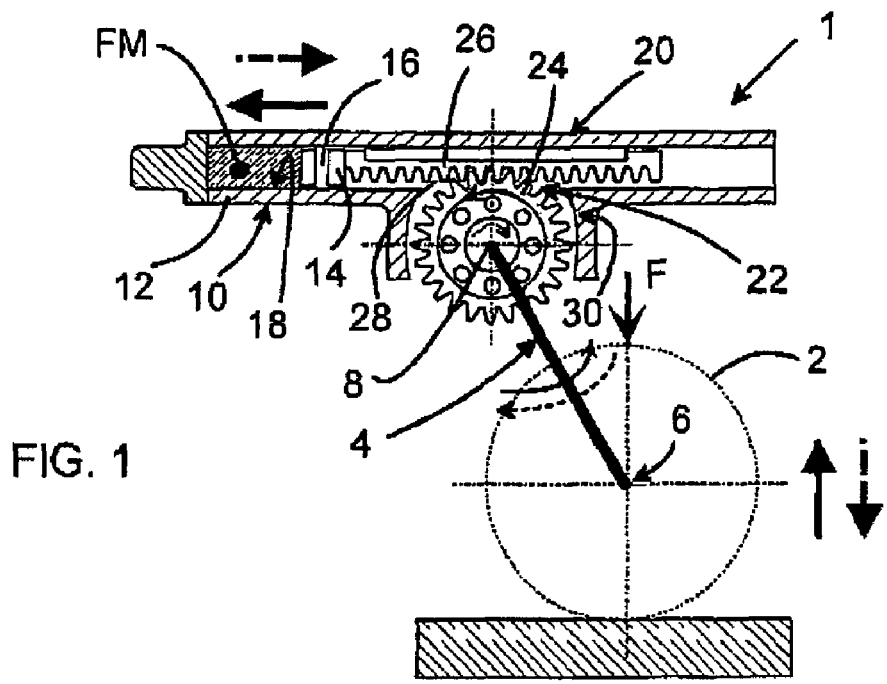
FIG. 1 shows a first, very simple basic embodiment of a suspension device according to the invention.

In the various figures of the drawing, identical or functionally corresponding parts and components are provided with the same reference numbers. In this respect, each description of a part which refers to one or more specific figures of the drawing applies analogously to the other figures of the drawing in which the part can likewise be seen with the corresponding reference number.

As emerges first of all in FIG. 1, a suspension device 1 according to the invention serves for the suspension of an individual wheel, i.e. for the load-bearing and resilient support of a single wheel 2 (only indicated schematically) of a motor vehicle. For this purpose, the wheel 2 is mounted rotatably about a wheel axis 6 at one end of an oscillating-crank supporting arm 4, it being possible for the oscillating-crank supporting arm 4 to be pivoted about an oscillating-crank axis 8 parallel to the wheel axis 6, so that it is pivoted to and fro in an oscillating manner about the oscillating-crank axis 8 by means of approximately vertical wheel suspension movements. It should be mentioned in this regard that, in the figures of the drawing, in the case of compression of the wheel 2, the movements and flow directions are illustrated in each case by means of solid arrows and, in the case of rebound, are illustrated by dashed lines.

Figure 28:
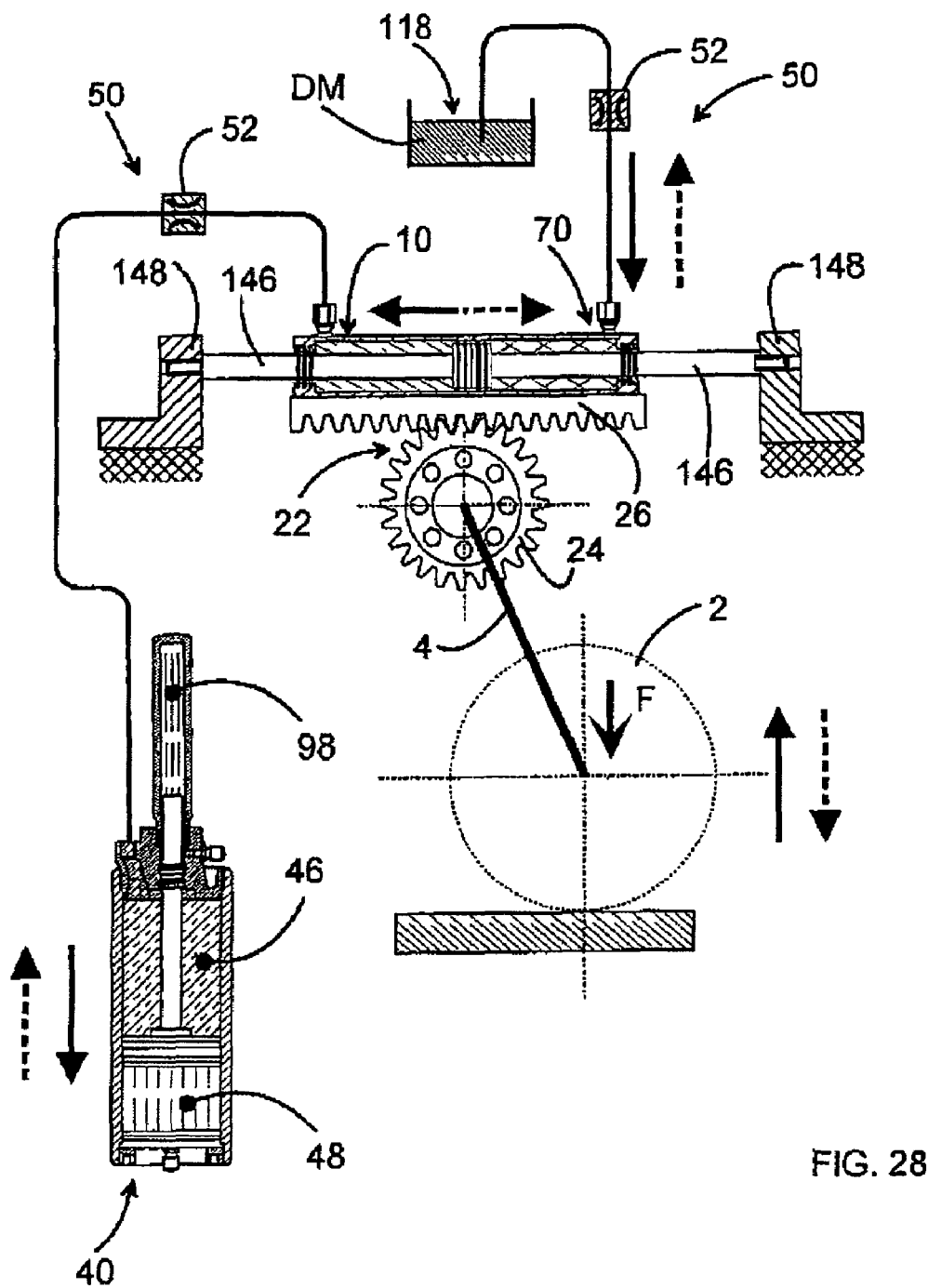
FIGS. 28 and 29 show two variant embodiments with a "kinematic reversal" in the region of the/each spring/damper cylinder.
Figure 29:
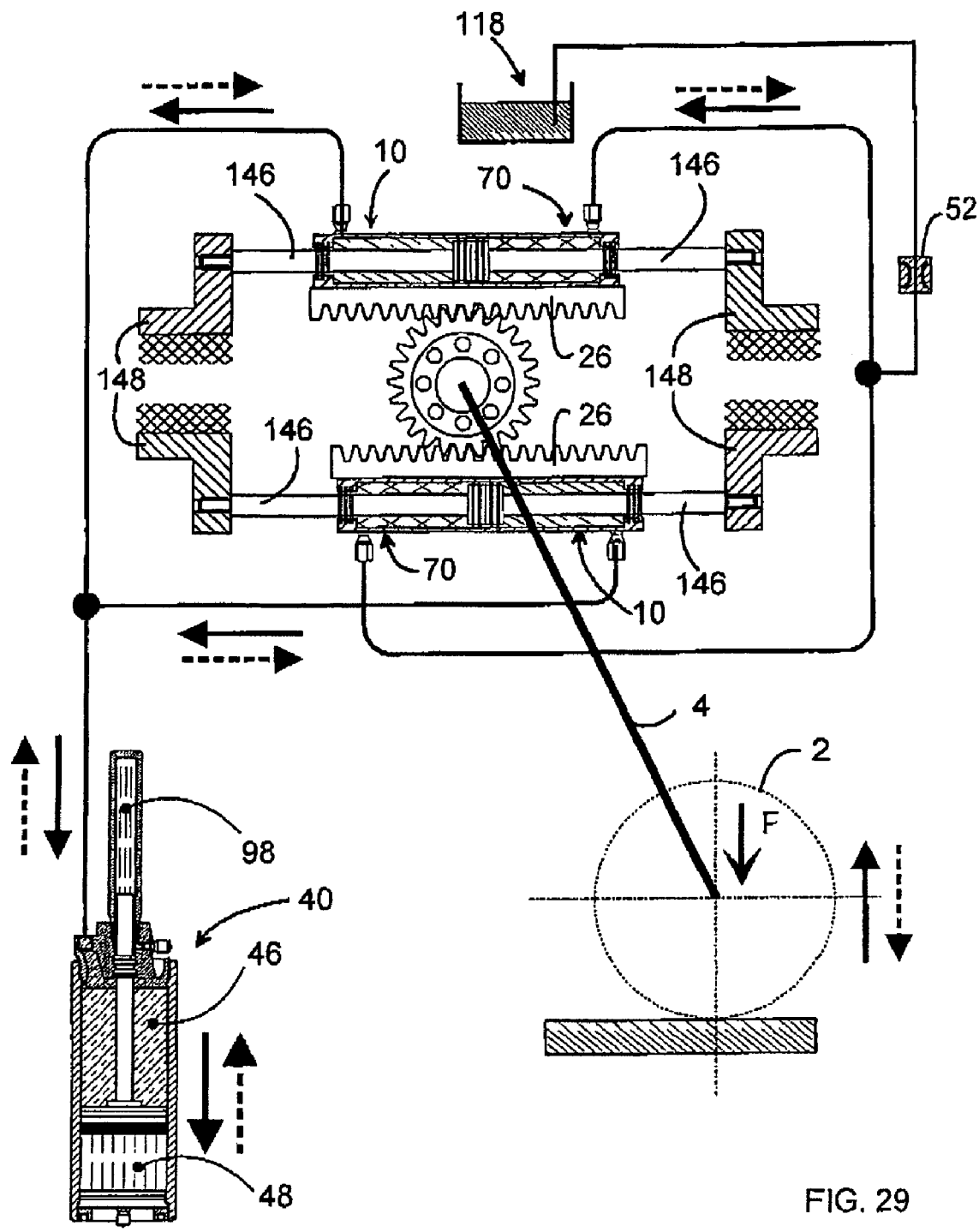

In the very simplest basic version according to FIG. 1, the suspension device 1 comprises a spring cylinder 10 which, for its part, comprises a pressure cylinder 12 and a piston 14 which is guided therein in a manner moveable relative to it. It should already be mentioned at this point that, with regard to this relative movement, both alternatives are possible as shown in FIG. 1, the pressure cylinder 12 can be secured in a positionally fixed manner to the vehicle and the piston 14 can be moveable, as shown in FIGS. 28 and 29, in the case of a piston 14 supported in a fixed position, the pressure cylinder 12 may be moveable. The piston 14 is sealed off from the inner wall of the pressure cylinder 12 via a circumferential seal 16, with the result that it forms a displaceable boundary wall of a cylinder pressure space 18. In this embodiment, the pressure space 18 is filled with an elastically compressible spring medium FM, so that the piston 14 acts directly counter to the spring medium FM. Furthermore, the suspension device 1 has a driving device 20 in such a manner that the oscillating suspension pivoting movements of the oscillating-crank supporting arm 4, which supports the wheel 2, can be converted into the linear relative movements between the pressure cylinder 12 and piston 14. In this case, the piston 14 acts counter to the spring medium FM in such a manner that the elastic compression thereof results in the production of a supporting spring force F which supports the particular wheel load or corresponds thereto.

According to the invention, the driving device 20 is designed as a gearwheel mechanism 22. This gearwheel mechanism 22 comprises a gearwheel element 24, which is mounted in a rotating manner about the oscillating-crank axis 8, and a rack element 26 which, in the case of the first embodiments after FIG. 1, is connected to the piston 14 while the pressure cylinder 12 is fastened in a positionally fixed manner in the vehicle. The gearwheel element 24 is connected or can be connected to the oscillating-crank supporting arm 4, with the result that the suspension movements of the wheel 2 and the oscillating pivoting movements of the oscillating-crank supporting arm 4 cause the gearwheel element 24 to be rotated to and fro correspondingly in an oscillating manner. The piston 14 is thereby correspondingly moved linearly to and fro via the rack element 26. According to the rotational movement range of the gearwheel element 24 that is necessary in this case, it would in principle be sufficient if the latter were to have a peripheral toothing only over a corresponding subregion of its circumference. However, in the preferred embodiments which are illustrated, a completely toothed gearwheel element 24 is provided in each case.

The forces which are transmitted by the wheel 2 to the gearwheel element 24 via the oscillating-crank supporting arm 4 during compression lead to the gearwheel element 24 rotating and to the piston 14 thereby being displaced in the direction of the pressure space 18 via the rack element 26. Compression of the compressible spring medium FM in the pressure space 18 causes the piston displacement to oppose a rising force. The particular movement ends if an equilibrium arises between the force which acts on the wheel 2 and the compression force of the spring medium FM in the pressure space 18. If the forces on the wheel 2 are smaller than the compression force of the spring medium FM, the spring medium in the pressure space 18 expands and displaces the piston 14, so that the oscillating-crank supporting arm 4 together with the wheel 2 executes a corresponding pivoting movement in the rebound direction via the gearwheel mechanism 22.

In the embodiment according to FIG. 1, only the cylinder pressure space 18 is filled, in particular completely, with the compressible spring medium FM. In this case, this spring medium FM is a compressible liquid having a compressibility of at least 10%. Silicone which can have a compressibility of approximately 18% can advantageously be used, for example.

On its side facing away from the pressure space 18, the pressure cylinder 12 is extended in a tubular manner. This region serves for mechanically guiding the rack element 26. In this connection, the gearwheel element 24 engages in the region of the rack element 26 through an opening 28. The entire arrangement of spring cylinder 10 and gearwheel mechanism 22 is preferably combined by means of a common support element 30 and, as a result, can be fastened to the vehicle via the support element 30. In this case, the support element 30 may advantageously also have the bearing means for the gearwheel mechanism 22 and the gearwheel element 24. The wheel 2 is therefore suspended via the oscillating-crank supporting arm 4 on the suspension device 1, which is secured on the vehicle.

Figure 2:
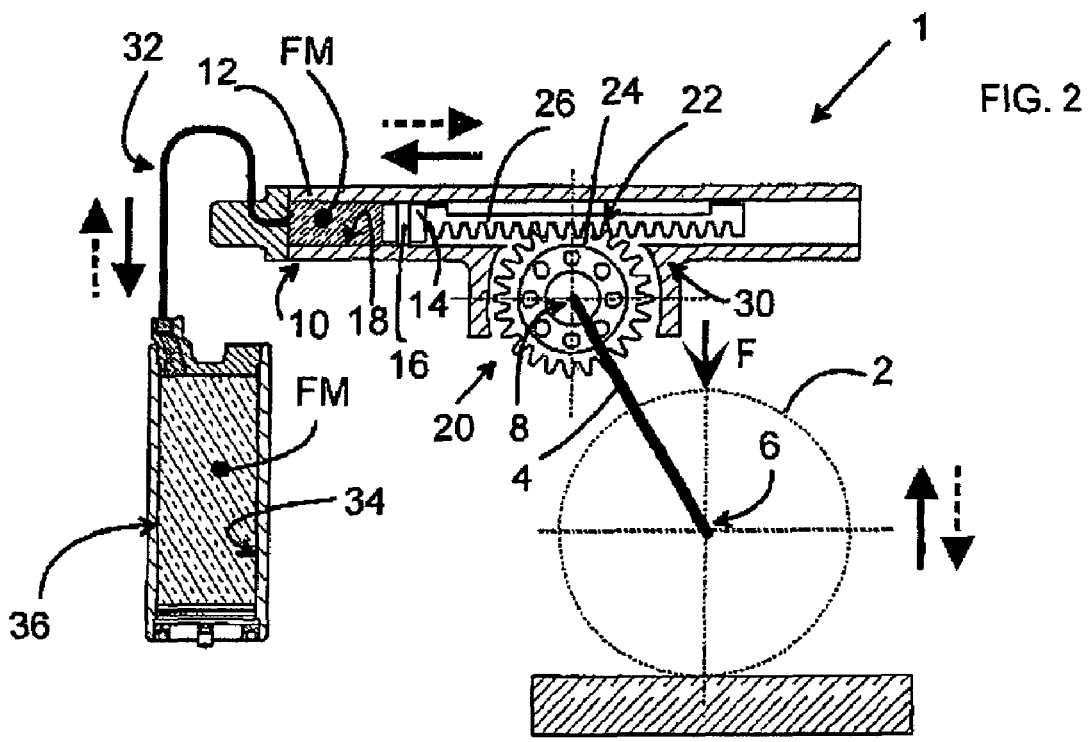
FIGS. 2 and 3 show advantageous developments of the embodiment according to FIG. 1.

As far as the embodiment according to FIG. 2 is concerned, it first of all corresponds essentially to the embodiment according to FIG. 1. The sole difference here is that the pressure space 18 is connected via a line 32 to an additional space 34 which is likewise preferably completely filled with the compressible spring medium FM. As illustrated, the additional space 34 may be formed by a separate storage reservoir 36. During a compression of the wheel 2, not only is the spring medium FM in the pressure space 18 compressed here, but so too is the additional spring medium in the additional space 34. The same also applies to a relaxation of the spring medium in the case of the wheel 2 rebounding. In this embodiment, an increase in the available volume of the spring medium FM is therefore achieved (greater compression volume). This enables the spring characteristic to be changed and/or the maximum stroke of the spring travel (also stroke of the rack element 26) can be increased. This will be explained using a simple example. If, for example, the spring medium used has a compressibility of 18%, this means that, for example, 100 cm$^3$ can be compressed to 82 cm$^3$, with a specific rise in force being required for this compression. Consequently, the volume can be used to establish the ratio of the compression, or, with the same compression ratio, the stroke (spring travel) can be increased or reduced.

The advantage of the embodiments according to FIGS. 1 and 2 is that only one medium FM is used. Furthermore, in comparison to a gas, a simple sealing is possible. In addition, a significant advantage of the compressible liquid, in comparison to a gas, is that a change in volume in the event of a change in temperature is much smaller than in the case of gas. An additional outlay on compensating for changes in volume caused by temperature is advantageously rendered superfluous by this. However, the embodiments according to FIGS. 1 and 2 permit only a relatively small change in the compression ratios within the existing suspension device 1. In addition, the entire working volume has to be relatively large because the compressibility is relatively small.

Figure 3:
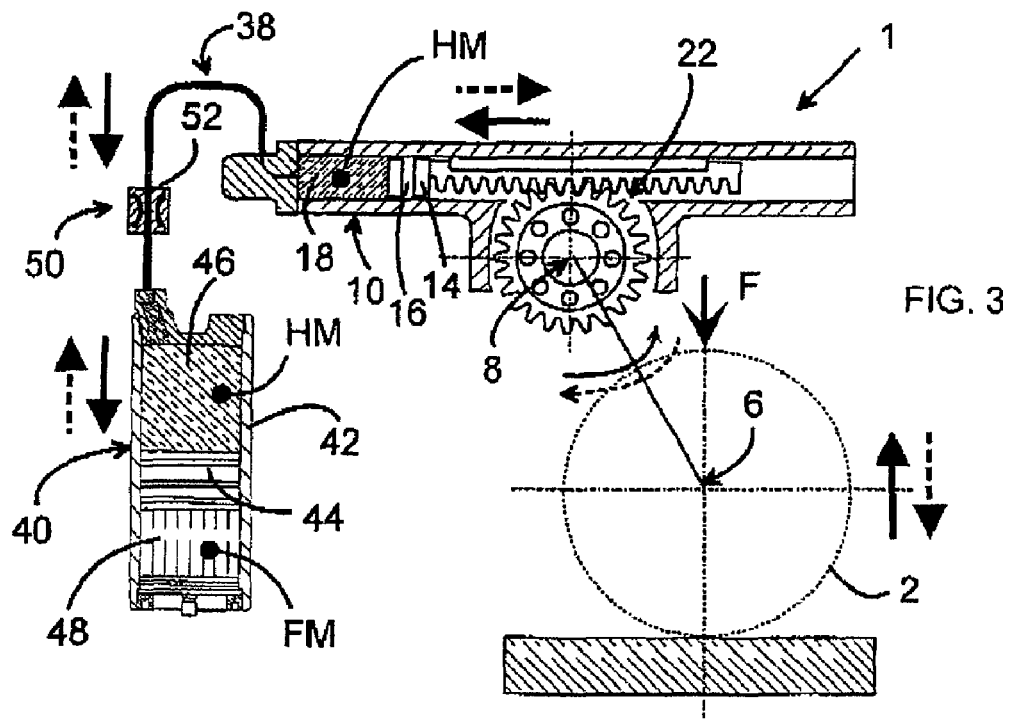

Provision is therefore made in the embodiments from FIG. 3 for the piston 14 to act counter to a compressible, pneumatic spring medium FM indirectly via a medium HM which is hydraulic and is therefore virtually incompressible or only insignificantly compressible. In this embodiment, provision is made in this regard, for example, for the pressure space 18 of the spring cylinder 10 to be connected via a line 38 to a hydropneumatic spring energy store 40. This spring energy store preferably comprises a storage cylinder 42 and a separating piston 44, which is guided in a freely moveable and floating manner in it and separates a storage space 46 from a spring chamber 48. In this case, the pressure space 18 of the spring cylinder 10 and the storage space 46 of the spring energy store 40 are filled with the hydraulic medium HM. A suitable gas is arranged under compression prestress in the spring chamber 48. Gas as the spring medium FM has the advantage of being able to be very heavily compressed. Since a heavy compression is intended to be obtained, it is a prerequisite that the gas is not inflammable. "Inert gases", such as nitrogen, argon, helium, krypton or neon, fulfill this prerequisite.

The advantage of the embodiment according to FIG. 3 is that in this case a very simple adaptation of the compression force or spring characteristic can be realized. This can take place by adjusting the pressure of the gas volume when filling the spring chamber 48. A further advantage is that the compression volume can be substantially smaller than in the case of the compressible liquid according to FIGS. 1 and 2. This enables a very small structural volume of the device overall to be achieved.

In a further refinement, a damping device 50 is provided in the embodiment according to FIG. 3 to damp the suspension. To be precise, primarily the rebound movements. For this purpose, a damping valve 52 is arranged in the line connection 38 between the spring cylinder 10 and spring energy store 40. The damping takes place in this case by throttling the flow of hydraulic medium HM.

Figure 4:
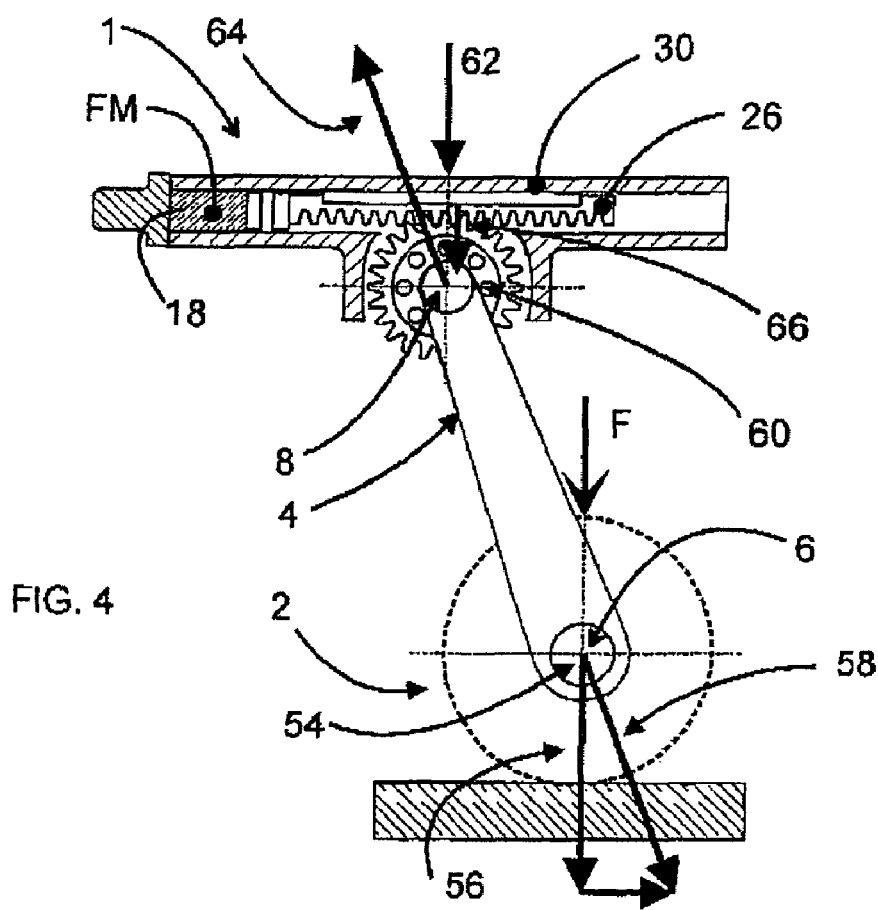
FIG. 4 shows an illustration analogous to FIG. 1 to illustrate forces which occur in the region of the driving device or of the gearwheel mechanism according to the invention.

The forces acting in each case in the embodiments according to FIGS. 1 to 3 are shown in FIG. 4. A bearing load 58, which is caused by the weight 56 and the particular oblique position of the oscillating-crank supporting arm 4 with respect to the vertical, acts in the region of a rotary bearing 54 of the wheel 2. Accordingly, a rotary bearing 60 of the gearwheel element 24, which is connected to the oscillating-crank supporting arm 4, is loaded by the weight 62 with the force 64. In this case, in the region of the toothings of the gearwheel mechanism 22 that are in engagement, a tooth force 66 acts in the direction of the rotary bearing 60. For this reason, it is favorable to arrange the rack element 26 on the (vertically upper) side of the gearwheel element 24 that lies opposite the wheel 2 and the oscillating-crank supporting arm 4.

In the embodiments according to FIGS. 1 to 4, the toothed engagement on one side of the gearwheel element 24 therefore causes tooth forces to act in each case on the rotary bearing 60. These tooth forces may be relatively high, since the entire force acts via the (only one) rack element 26.

Figure 5:
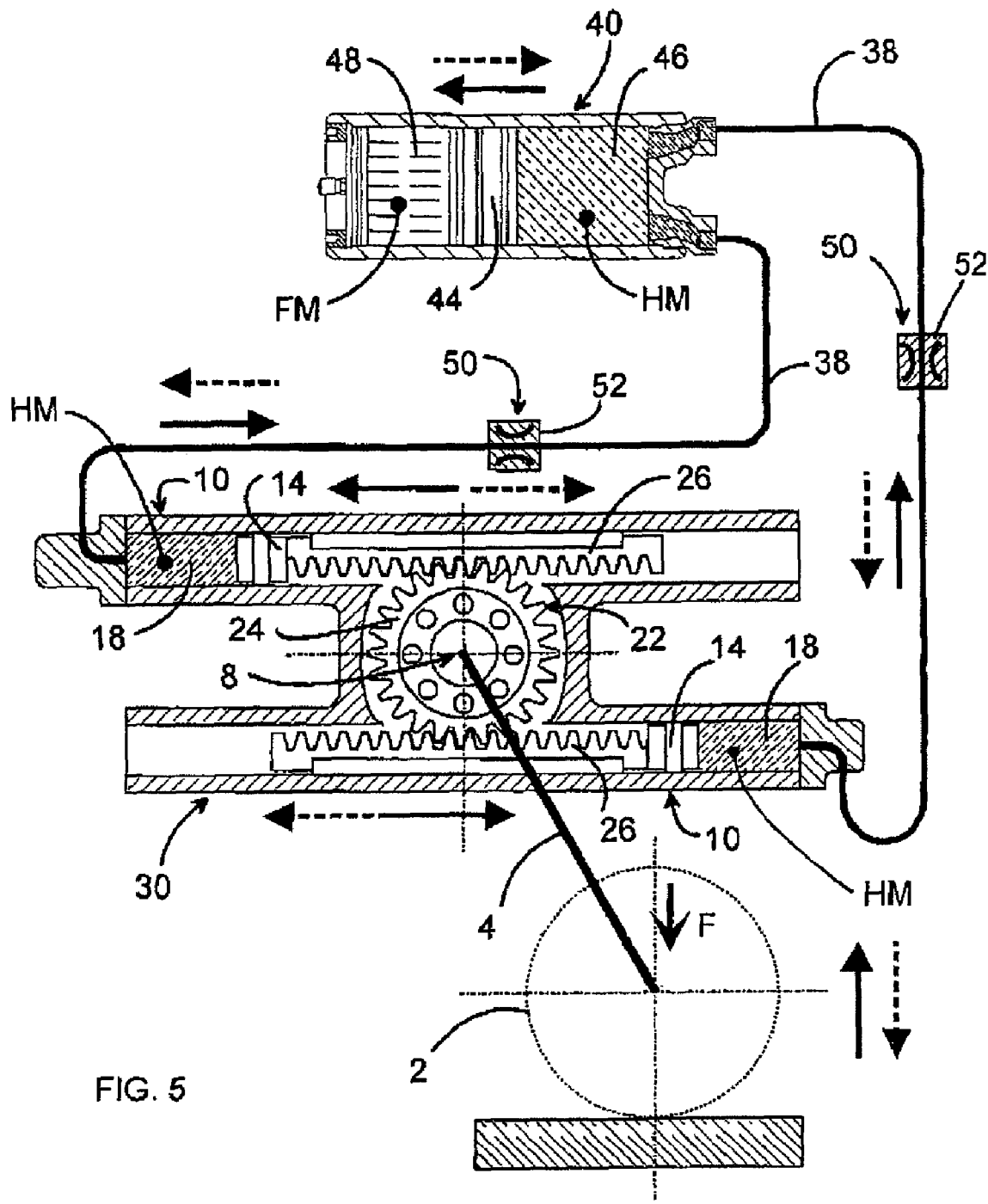
FIGS. 5 to 15 show further advantageous embodiments of the suspension device according to the invention.

In an advantageous refinement according to FIG. 5, provision is therefore made for the gearwheel mechanism 22 to act via the same gearwheel element 24 counter to an additional spring cylinder 10 acting identically. This preferably concerns an arrangement which is centrically or axially symmetrical to the oscillating-crank axis 8, with two rack elements which are assigned to the tooth spring elements 10, being in engagement with the gearwheel element 24 on diametrically opposite sides of the latter. This gives rise to an H-shaped arrangement. In this embodiment according to FIG. 5, the two pressure spaces 18 of the spring cylinder 10 are connected to the same hydropneumatic spring energy store 40 via lines 38. A damping valve 52 can be connected into each line 38 as illustrated. The significant advantage of this embodiment according to FIG. 5 is that the forces are halved in the region of the particular toothing and, in addition, the mounting of the gearwheel element 24 is relieved of load. All in all, a more favorable (symmetrical) distribution of forces therefore arises.

Figure 6:
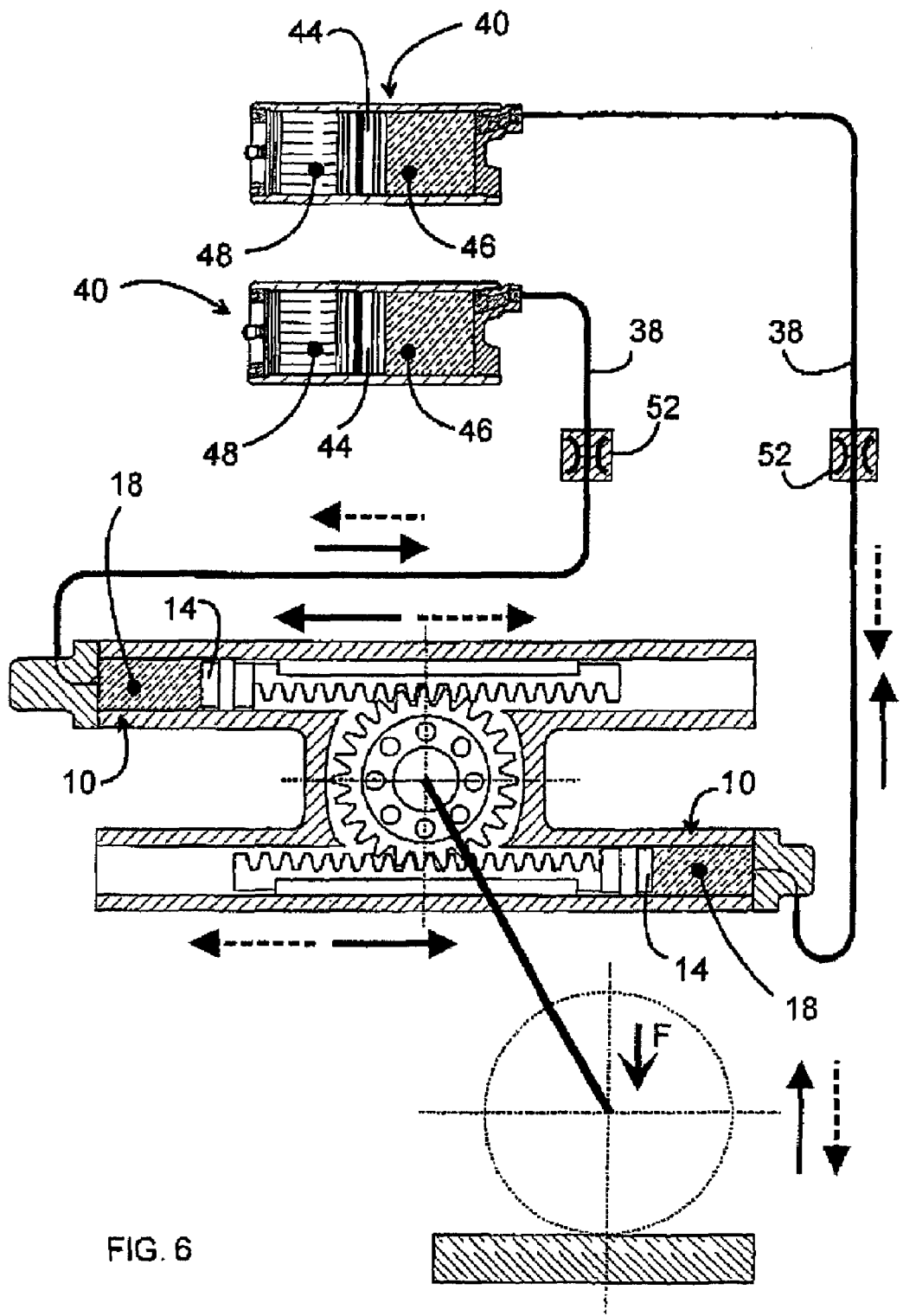

The embodiment according to FIG. 6 corresponds largely to that according to FIG. 5. The only difference here is that each pressure space 18 of the two identically acting spring cylinders 10 is connected to one of two separate spring energy stores 40. This enables the force or the force profile to be set in a manner such that it can be changed via the stroke or travel of the rack elements 26 by means of a different compression setting of the spring medium within the two spring chambers 48. This makes it possible to realize a certain force profile, since the forces of the two rack elements on the gearwheel element add up. Consequently, the stroke or travel of the rack elements, and therefore the angle of rotation of the gearwheel element 24, can be used to realize different force profiles than is possible in the case of the compression just of one spring medium or gas volume. This advantageous refinement may be used in order to achieve a high increase in force, for example toward the end of the spring travel. By this means, the wheel 2 is sharply braked during the compression, and the mechanical stop is not as hard. Also in this embodiment according to FIG. 6, a damping valve 52 may be arranged in at least one or in both lines 38.

In the case of the previously described embodiments with the damping device 50, the hydraulic medium HM in the suspension circuit is damped in each case. The hydraulic medium HM is heated in each case by the damping or throttling. This heat is transferred to the spring medium FM, whereupon a temperature-induced change in pressure results.

Figure 7:
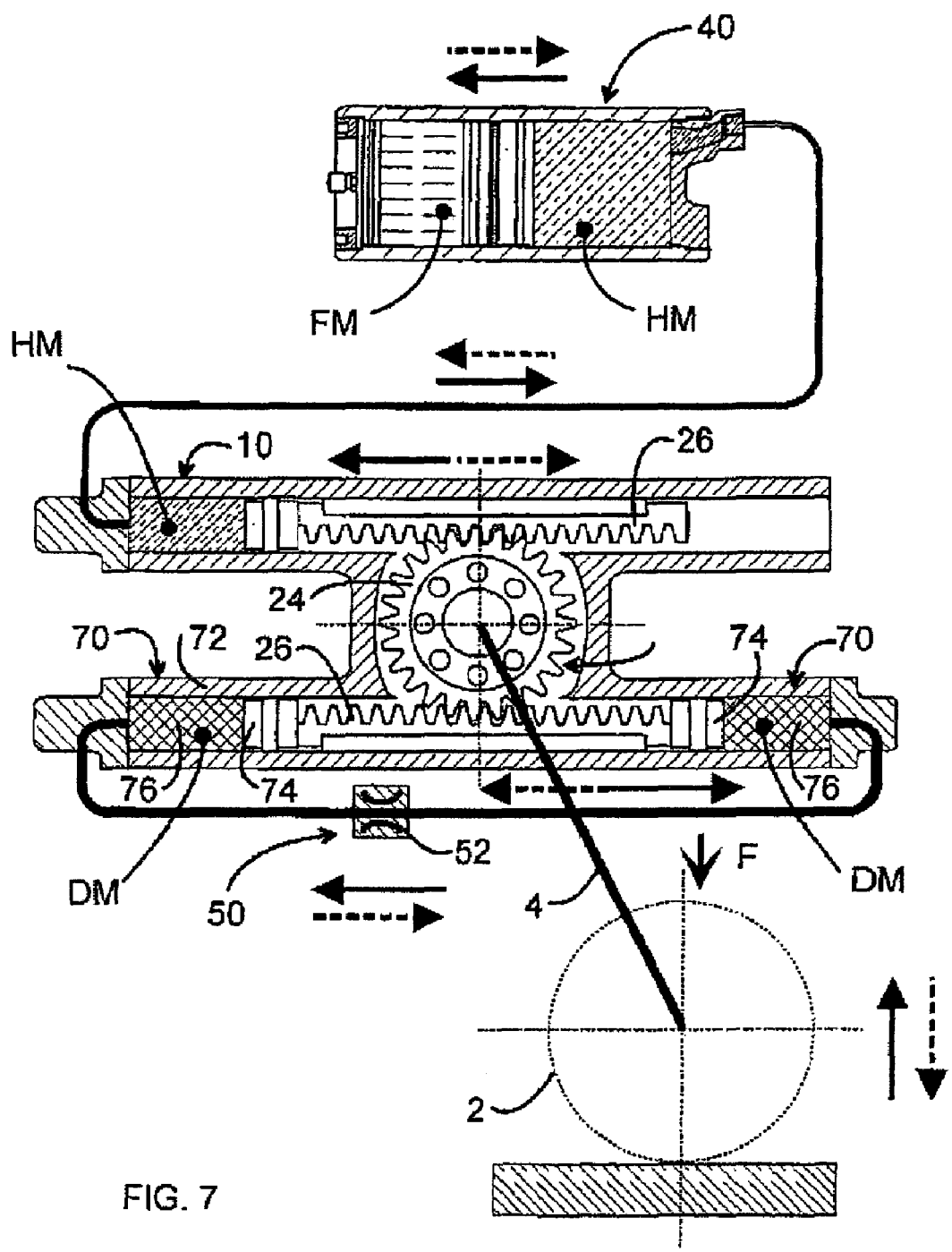

Therefore, in the case of the embodiments illustrated in FIG. 7, the invention makes provision for the damping device 50 to have a separate circuit of a hydraulic damping medium DM, which circuit is independent of the spring cylinder 10 and the spring medium FM. This advantageously results in a thermal decoupling of the damping circuit from the suspension circuit. For this purpose, the damping device 50 has at least one damper cylinder 70 with a damper piston 74 which is guided in a cylinder 72 in a manner moveable relative to it, and at least one damping valve 52 which is connected hydraulically to the damper cylinder 70. However, in the case of the embodiment according to FIG. 7, two opposed damper cylinders 70 are provided. The two damper pistons 74 of the two damper cylinders 70 are connected to the ends of a common rack element 26 and are driven by the same gearwheel element 24 as the rack element 26 of the spring cylinder 10. In a similar manner to FIGS. 5 and 6, the two rack elements 26 are arranged on diametrically opposite sides of the gearwheel element 24. Each damper piston 74 acts counter to the damper medium DM arranged in the cylinder space 76. The arrangement described enables the two cylinder spaces 76 to be changed in volume to exactly the same extent in opposite directions. As a result during the suspension movements, the damping medium DM is in each case forced out of one cylinder space 76 and received by the other cylinder space 76. This flow damps the damping medium DM in the damping valve 52.

Figure 8:
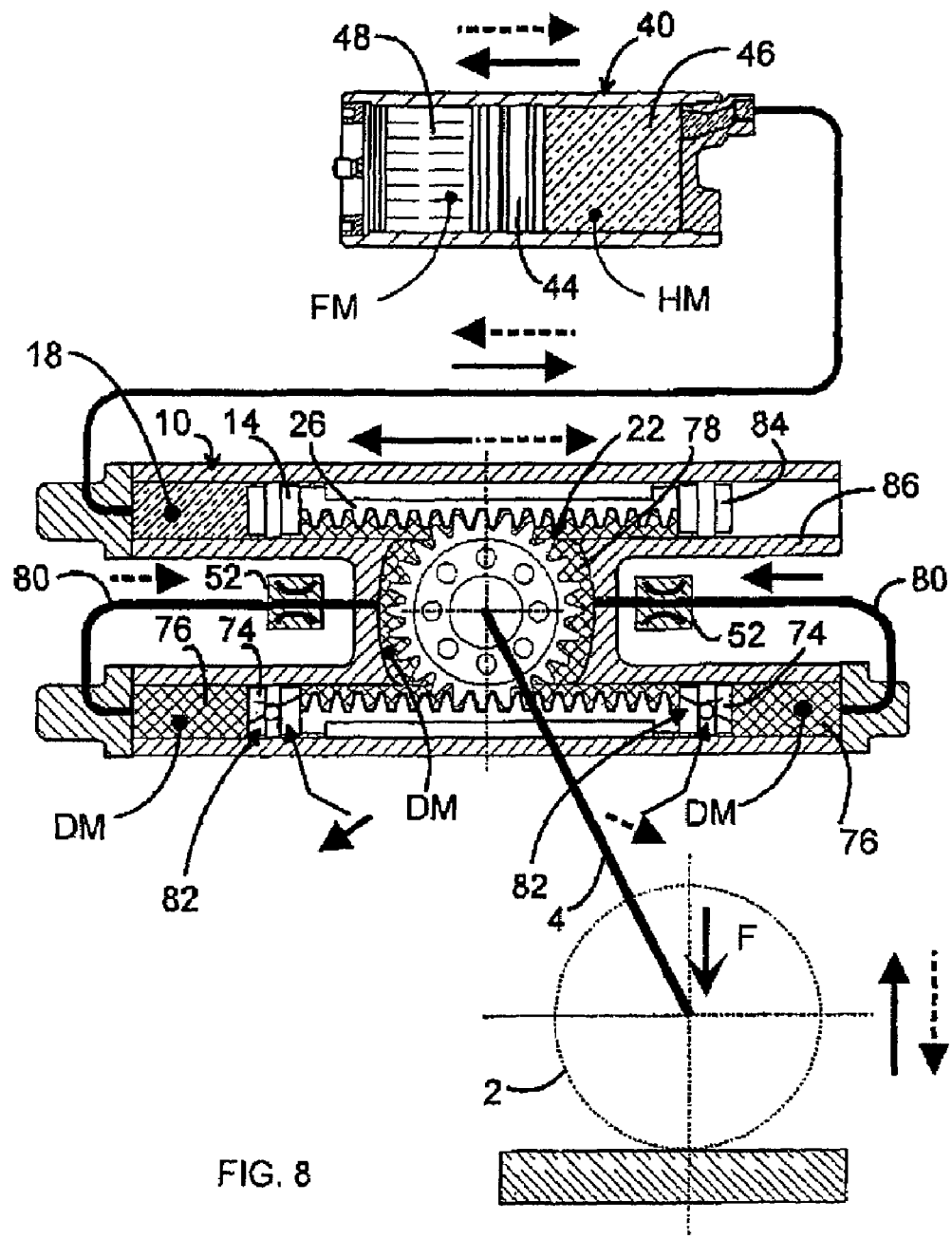

FIG. 8 illustrates a variant to FIG. 7, with a housing space 78 which accommodates the gearwheel mechanism 22 being incorporated into the damping circuit. For this purpose, the housing space 78 is filled with the damping medium DM and is connected to the two cylinder spaces 76 via respective lines 80. A damping valve 52 is arranged in each case in the lines 80. In addition, each damper piston 74 here preferably has a flow passage with a nonreturn valve (replenishing valve) 82. In this embodiment, the damping medium does not flow directly from one cylinder space 76 into the other cylinder space 76, but rather the damping medium DM displaced in each case is displaced into the housing space 78 via the respective damping valve 52, and the cylinder space 76 becoming larger in each case is filled via the replenishing valve 82 with the damping medium DM from the housing space 78 which accommodates the gearwheel mechanism 22. The significant advantage of this embodiment is that the gearwheel mechanism 22 and the bearing points of the gearwheel element 24 are arranged in an oil bath, and permanent lubrication is therefore ensured. In addition to this, it should be mentioned that, in order to seal the housing space 78, the rack element 26, which is connected to the piston 14 of the spring cylinder 10, is also connected on its opposite side to a further piston 84, this piston 84 being guided in a sealed manner in a cylinder section 86. That side of the cylinder section 86 which is opposite the rack element 26 is designed to be open and connected to the atmosphere.

Figure 9:
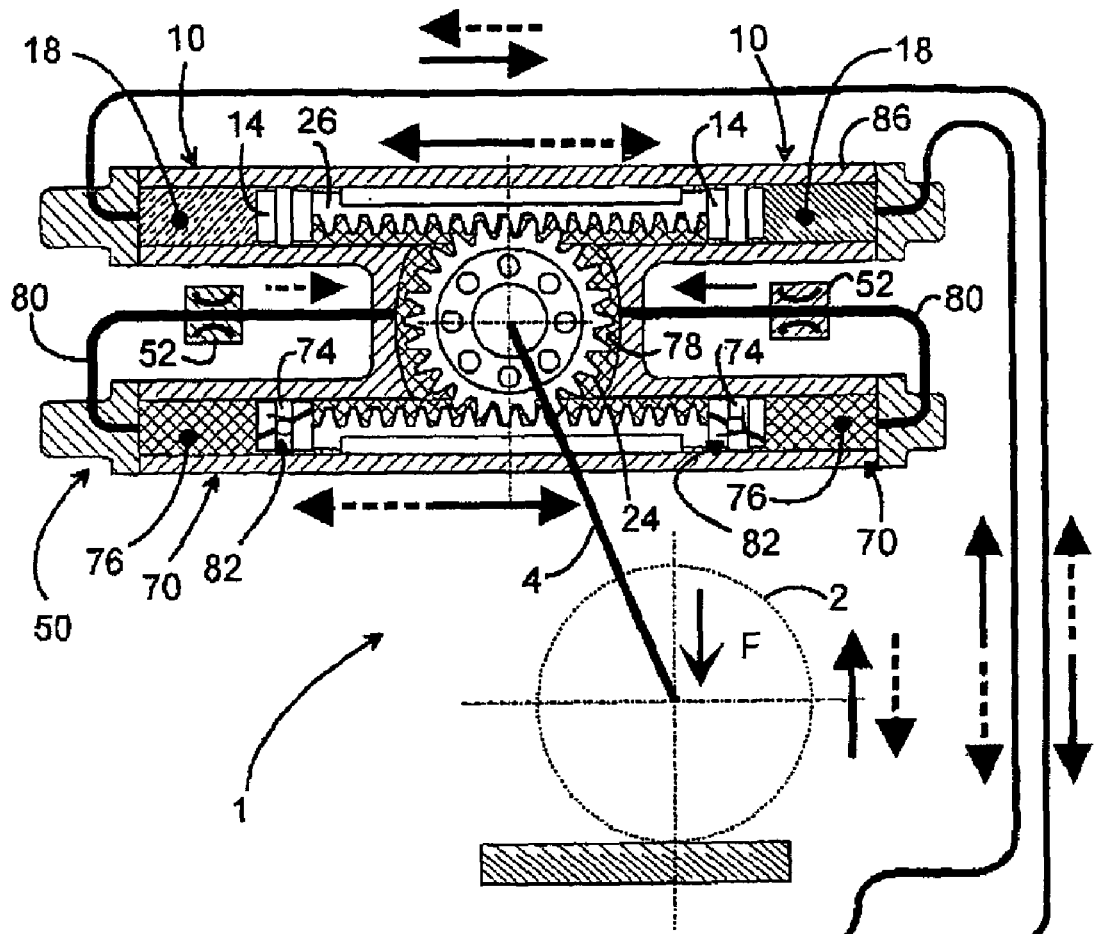
Figure 9:
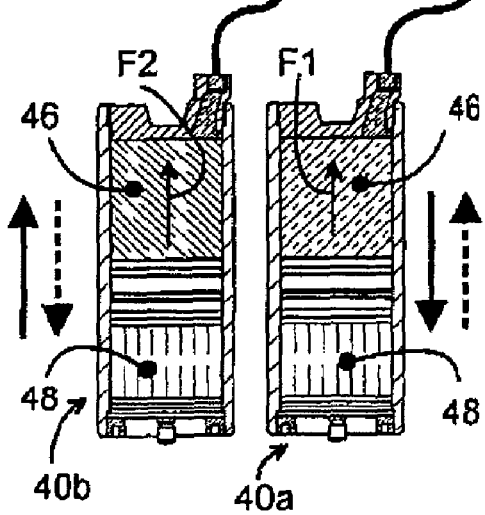

The embodiment according to FIG. 9 corresponds to the embodiment according to FIG. 8 in respect of the damping device 50. By contrast, the difference here is that the region of the cylinder section is designed as an additional spring cylinder 10. The two spring cylinders 10 which are therefore present act in an opposed manner by the pistons 14 being connected via the same rack element 26. The pressure spaces 18 which can therefore be changed in volume in an opposed manner are connected to in each case one of two separate spring energy stores 40. As a result, the pressures of the two spring energy stores 40 consequently act counter to each other so that a differential force arises at the rack element 26, and only this differential force acts, via the gearwheel element 24, as the actual spring force F of the suspension device 1.

Figure 26:
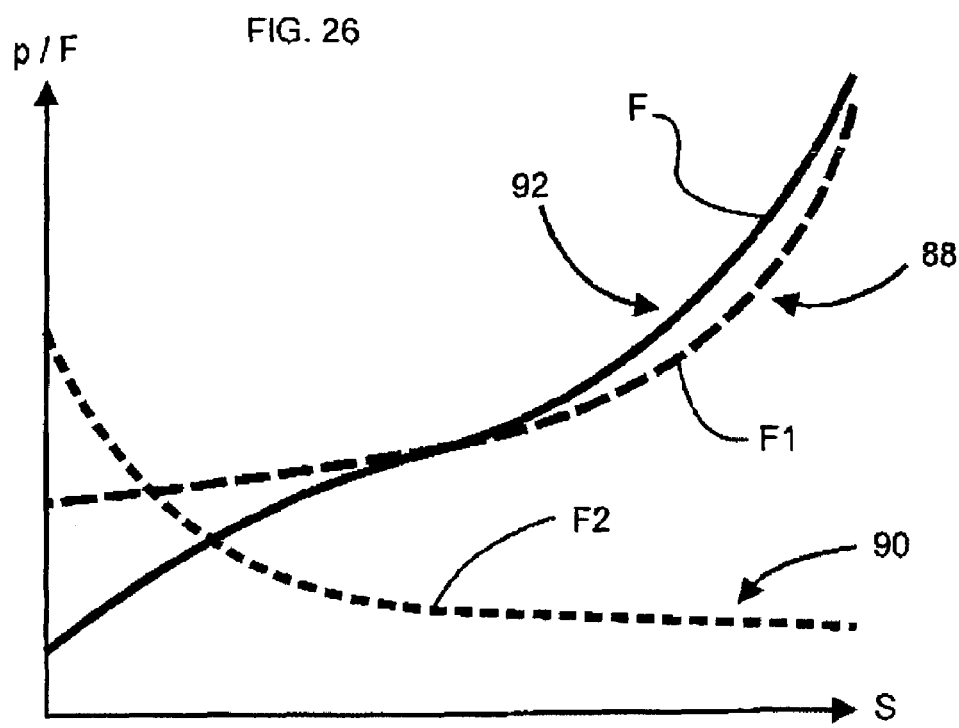
FIG. 26 shows a pressure and force/travel diagram for certain embodiments of the suspension device.

For this purpose, reference is made to the diagram illustrated in FIG. 26. In this, the pressure p or the resultant force F is illustrated over the spring travels. A first dashed characteristic curve 88 illustrates the force profile of the spring energy store 40a which is illustrated on the right-hand side in FIG. 9 and the pressure or force of which rises in the compression direction. A second dashed characteristic curve 90 illustrates the profile of the pressure or the force of the spring energy store 40b which is illustrated on the left-hand side in FIG. 9. A solid characteristic curve 92 illustrates the overall characteristic curve resulting from the addition of the two subordinate characteristic curves. The manner of operation is as follows: if, during a rotation of the gearwheel element 24, the (upper) rack element 26 is displaced, in one energy store the pressure increases and in the other in each case the pressure drops since the hydraulic medium is pushed out of one pressure space 18 into one spring energy store and the hydraulic medium from the other spring energy store flows into the opposite pressure space 18. The spring medium in one spring store is compressed and the pressure rises, and the spring medium in the other spring energy store is relaxed and the pressure drops. A prerequisite for the desired manner of operation is that the pressure in one spring energy store differs in the static position from the pressure of the other spring energy store. This is also illustrated in FIG. 26. The diagram furthermore shows that one force drops if the other force rises, and vice versa. The advantage of this embodiment is that the temperature effect of the change in volume of the spring medium is reduced. In the event of heating, both volumes in the spring chambers 48 expand. Since the expansion of one volume results in hydraulic medium being pushed into the associated pressure space 18 and the rack element 26 thus being displaced in the direction of the other pressure space 18, hydraulic medium is pushed out of the latter into the associated spring energy store 40. Since, however, the spring medium in this spring energy store also expands, the pressure is increased not only by the hydraulic medium flowing into it, but also by the temperature-induced expansion in the spring energy store. This dual increase in pressure results in only a relatively small displacement of the rack element 26 taking place by means of the spring energy store having higher pressure toward the spring energy store having the lower pressure. The rack element is therefore displaced substantially less than without the pressure counter control which is preferably provided. This means that the gearwheel element 24 likewise does not significantly rotate, which in turn means a small pivoting movement of the oscillating-crank supporting arm 4 with the wheel 2. The shifting in position of the wheel 2 on the oscillating-crank supporting arm 4 is small, with the result that, advantageously, also no additional measure is required for the ride-height control, for which purpose for example, the hydraulic medium could be conducted away into the system or let out of the latter.

Figure 10:
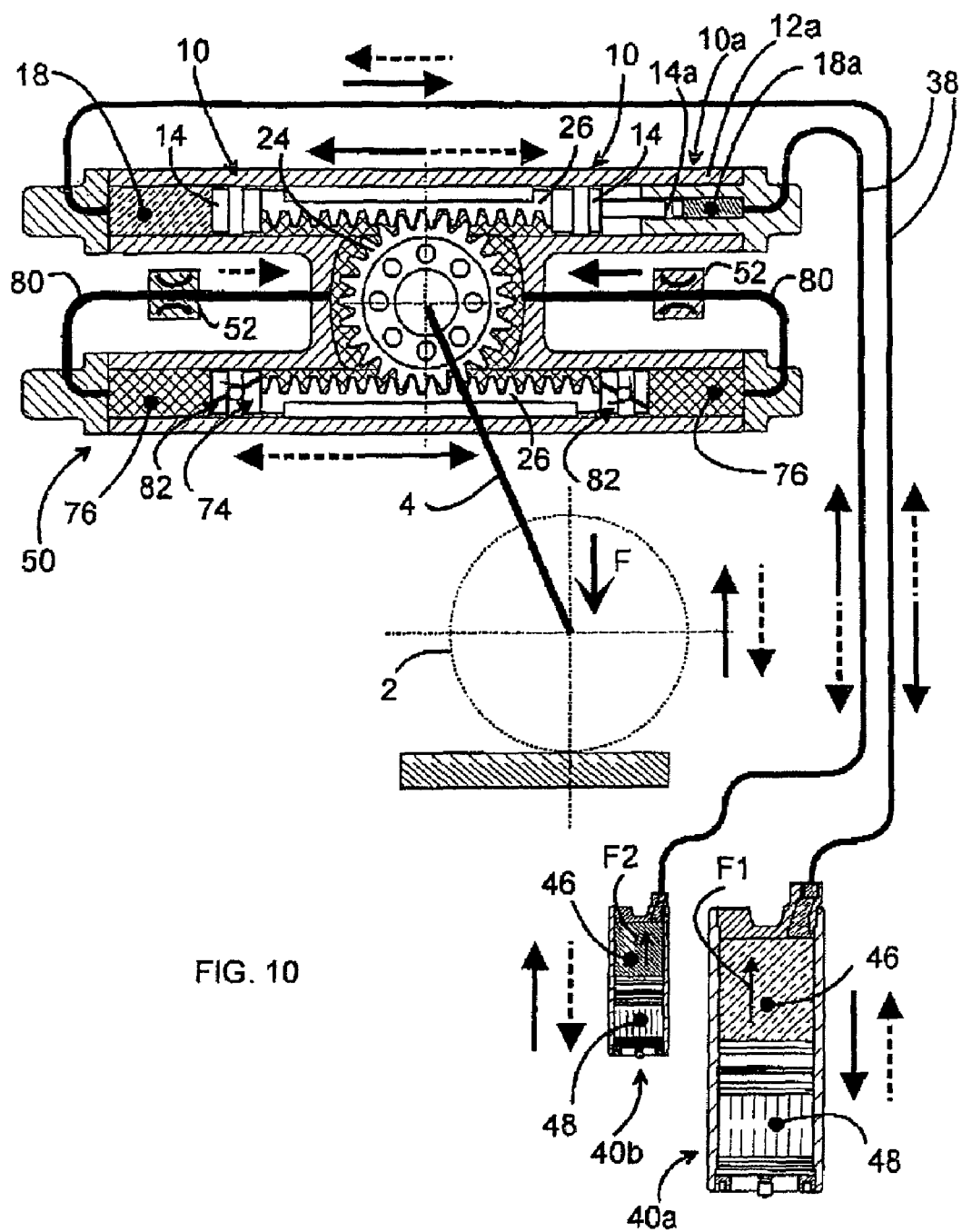

FIG. 10 illustrates a structural variant to the embodiment according to FIG. 9. This embodiment has in principle the same manner of operation as the embodiment according to FIG. 9 as far as the compensation of the effect of temperature is concerned. The only difference here is that the first pressure space 18, which is reduced during a compression of the wheel 2, has a larger volume and a larger cross section than the second pressure space 18a, which acts in an opposed manner. This is achieved in terms of structure by the pressure cylinder 12a of this spring cylinder 10a which acts in an opposed manner having a reduced internal cross section. In this case, the piston 14 is connected to a corresponding smaller additional piston 14a. The larger pressure space 18 is connected to a larger spring energy store 40a while the smaller pressure space 18a is connected to a smaller spring energy store 40b. The counter control for the compensation of the temperature expansion of the spring medium in the spring store 40a is therefore achieved by a relatively small displaced volume. The spring energy store 40b having a small spring medium volume into which the small hydraulic volume is pressed and is dimensioned in such a manner that a small hydraulic quantity leads to a high rise in pressure. This high rise in pressure leads to a large change in force which opposes the expansion of the spring medium in the larger spring energy store 40a.

Figure 11:
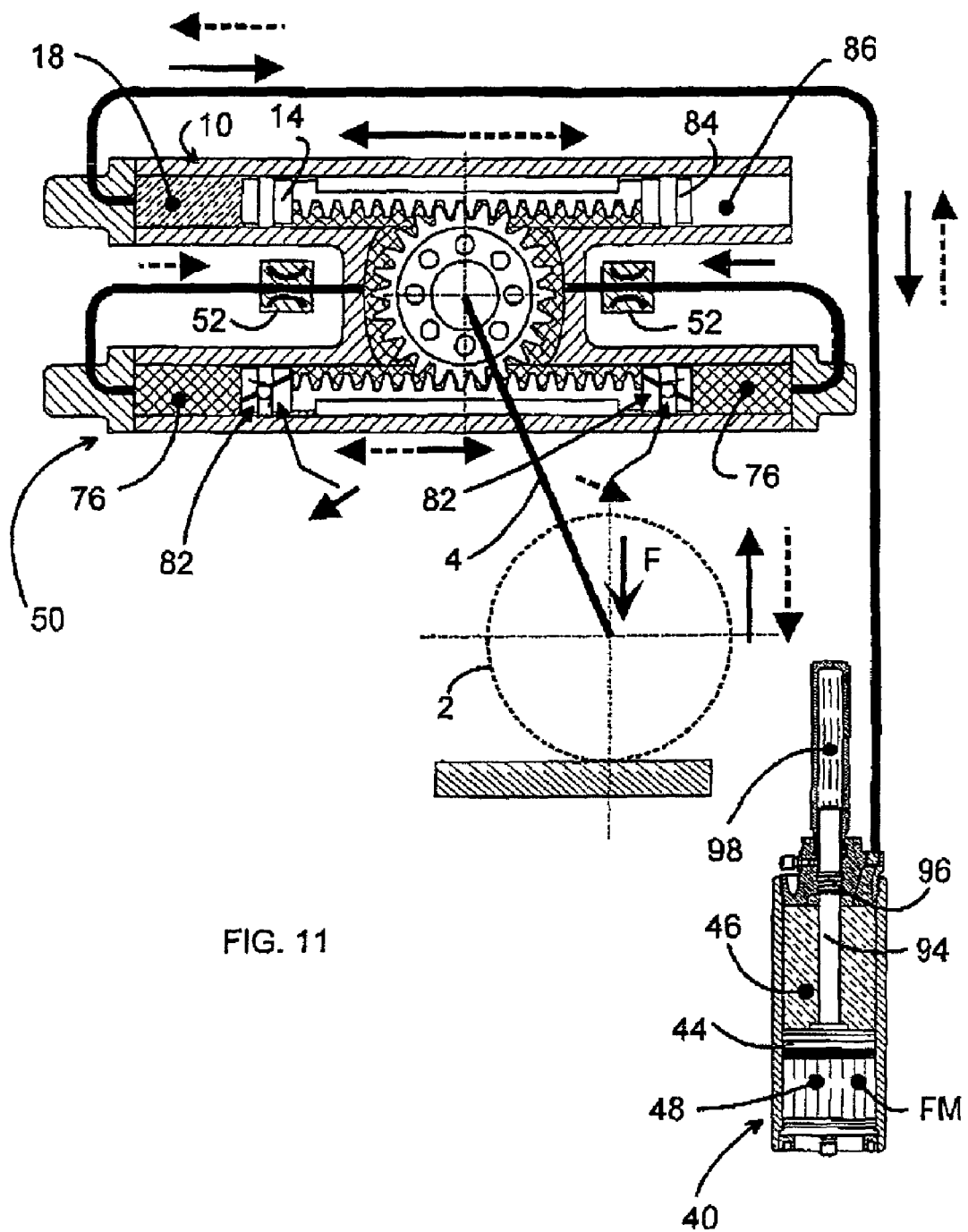

FIG. 11 shows a further variant to the embodiments according to FIGS. 9 and 10. In this case, instead of the opposed spring cylinders 10 and 10a, provision is made for the temperature compensation to be integrated directly in the spring energy store 40. In the embodiment illustrated, the separating piston 44 of the spring energy store 40 has for this purpose a piston rod 94 which extends axially through the storage space 46 and, in a manner sealed by means of an intermediate wall 96, protrudes into an additional pressure space 98. This pressure space 98 can be acted upon by an in particular pneumatic counter pressure. If the spring medium FM in the spring chamber 48 now expands, for example due to temperature, the separating piston 44 is displaced in the direction of the storage space 46. As a result, the piston rod 94 is also displaced further into the pressure space 98. Since there is a relatively small volume of gas in the pressure space 98, a small displacement of the piston rod 94 into this pressure space 98 results in a large change in the gas pressure. This gas pressure acts on the piston rod 94 and therefore builds up a force counter to the gas pressure of the larger volume of the spring chamber 48. This control has an ever greater effect the higher the filling pressure of the smaller pressure space 98. This advantageous configuration in the region of the spring energy store 40 leads to the advantage that an additional outlay for compensating a temperature-induced change in the ride height of the suspension system is not required because the shift is so slight that it can be entirely accepted as a technically justifiable change in ride height.

Figure 12:
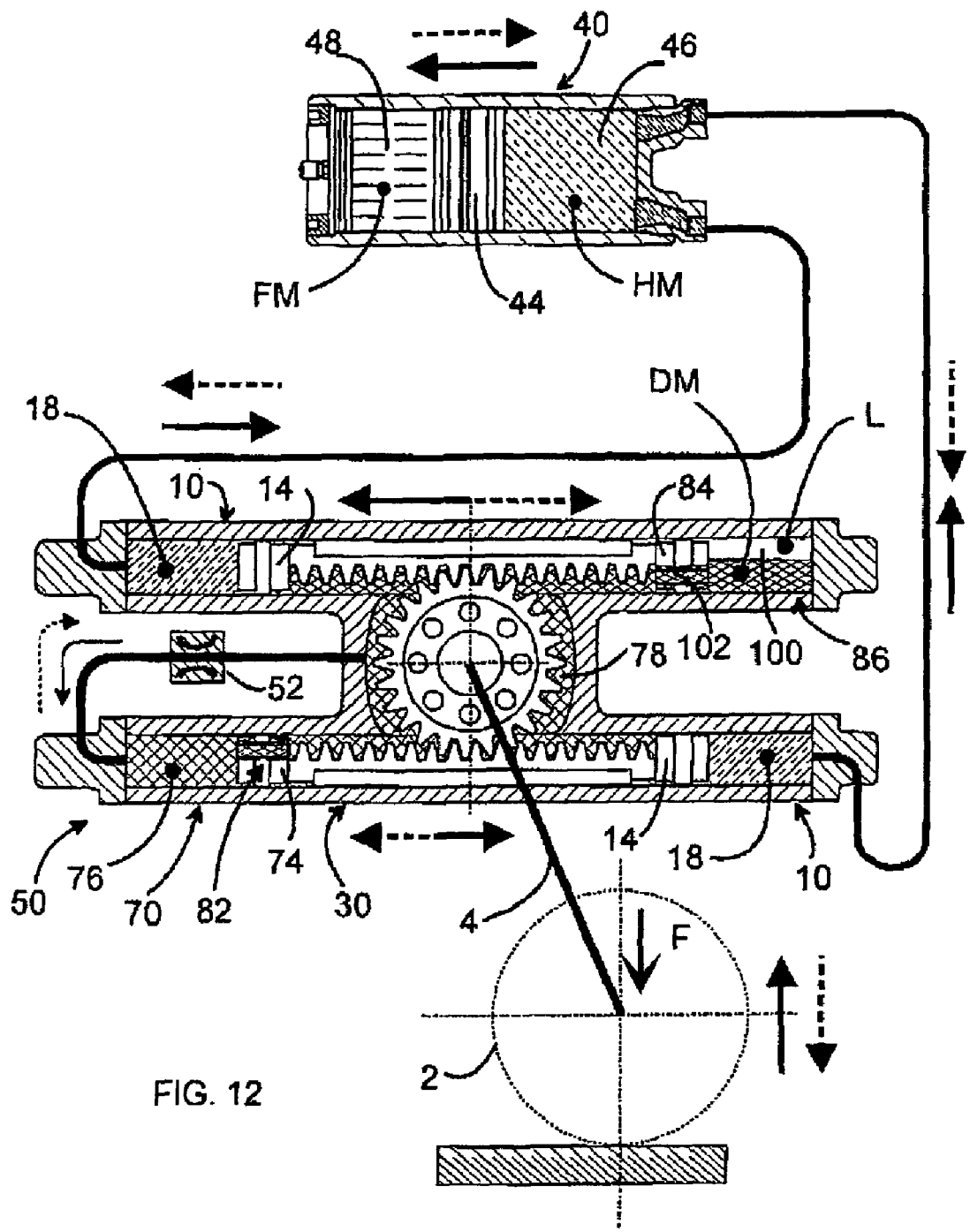

The embodiment which is illustrated in FIG. 12 corresponds in respect of the suspension circuit to the embodiment according to FIG. 5 having two spring cylinders 10 which act in an identical manner and interact with a common spring energy store 40 but which may also be connected, as defined in FIG. 6, to two separate spring energy stores 40. The damping device 50 is also independent of the suspension circuit here, but only one damper cylinder 70 is provided, the cylinder space 76 of which is connected to the housing space 78 via the damping valve 52. The damper piston 74 is also equipped here with a replenishing valve 82. In this connection, provision is preferably made for a compensating space 100 for the damping medium DM to be formed in the region of the cylinder section 86. This compensating space 100 is separated from the housing space 78 via the piston 84, but the piston 84 having a flow opening 102. Since, in the case of the suspension movements, the volume of the housing space 78 which is incorporated into the damping circuit always remains constant, the compensating space 100 serves as a tank for receiving the volume of the damping medium DM that is in each case displaced from or flows back out of the cylinder space 76 of the damper cylinder 70. The compensating space 100 also contains an air cushion L which is at least of sufficient size to be able to compensate for the maximum difference in volume of the damping device 50.

Figure 13:
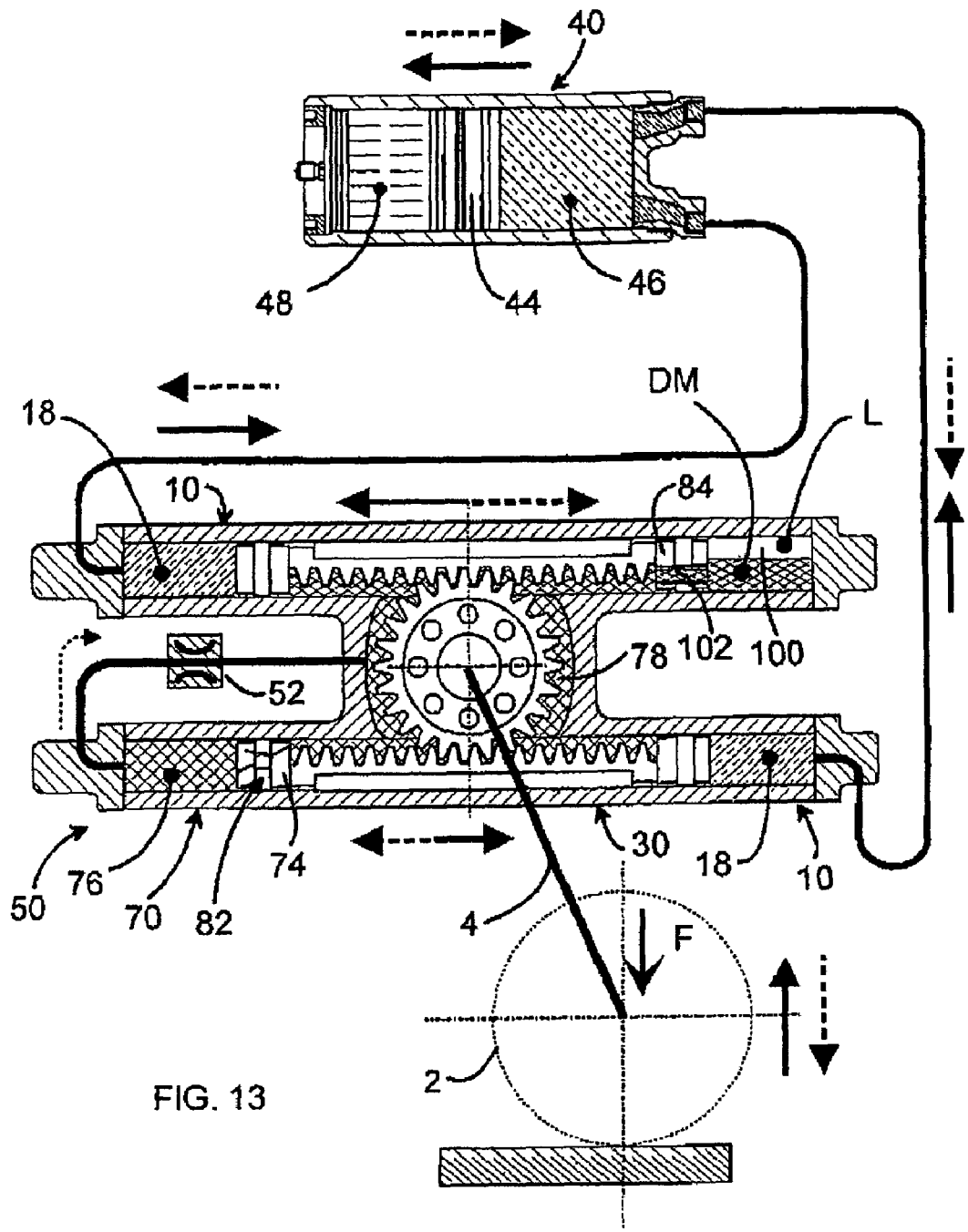

The embodiment according to FIG. 13 corresponds to that according to FIG. 12, but the flow path in the damping circuit is designed in such a manner that, when the damping medium DM is displaced out of the cylinder space 76, it flows only via the damping valve 52, but the required flowing-in, in the reverse case of an enlargement of the cylinder space 76, takes place only via the replenishing valve 82 in the damper piston 74. This solution has the advantage that the damping valve 52 can be designed to be simpler and therefore more cost-effective.

Figure 14:
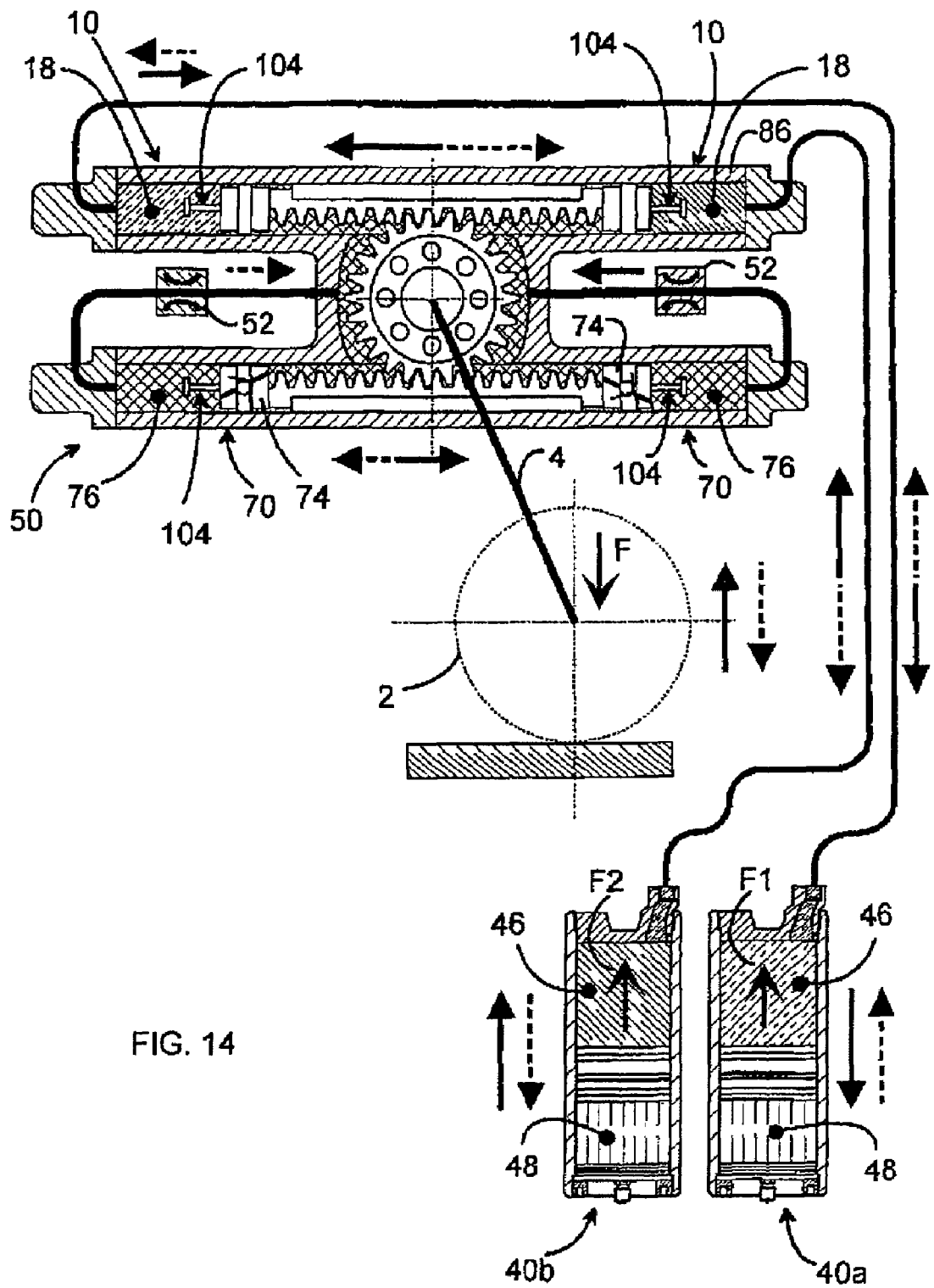

An advantageous development is explained with reference to FIG. 14, here by way of example on the basis of the embodiment according to FIG. 9. According to this development, a hydraulic end position damping is provided for which purpose a travel-dependent, hydraulic throttle device 104 is integrated at least in each spring cylinder 10. It is also preferably possible, as an alternative or in addition, for the damper cylinders 70 to be equipped with corresponding throttle device 104. These throttle devices 104 cause the movement in both directions toward the end of the suspension stroke to be braked in such a manner that hard mechanical impacts at the end of the suspension movements are avoided.

Figure 15:
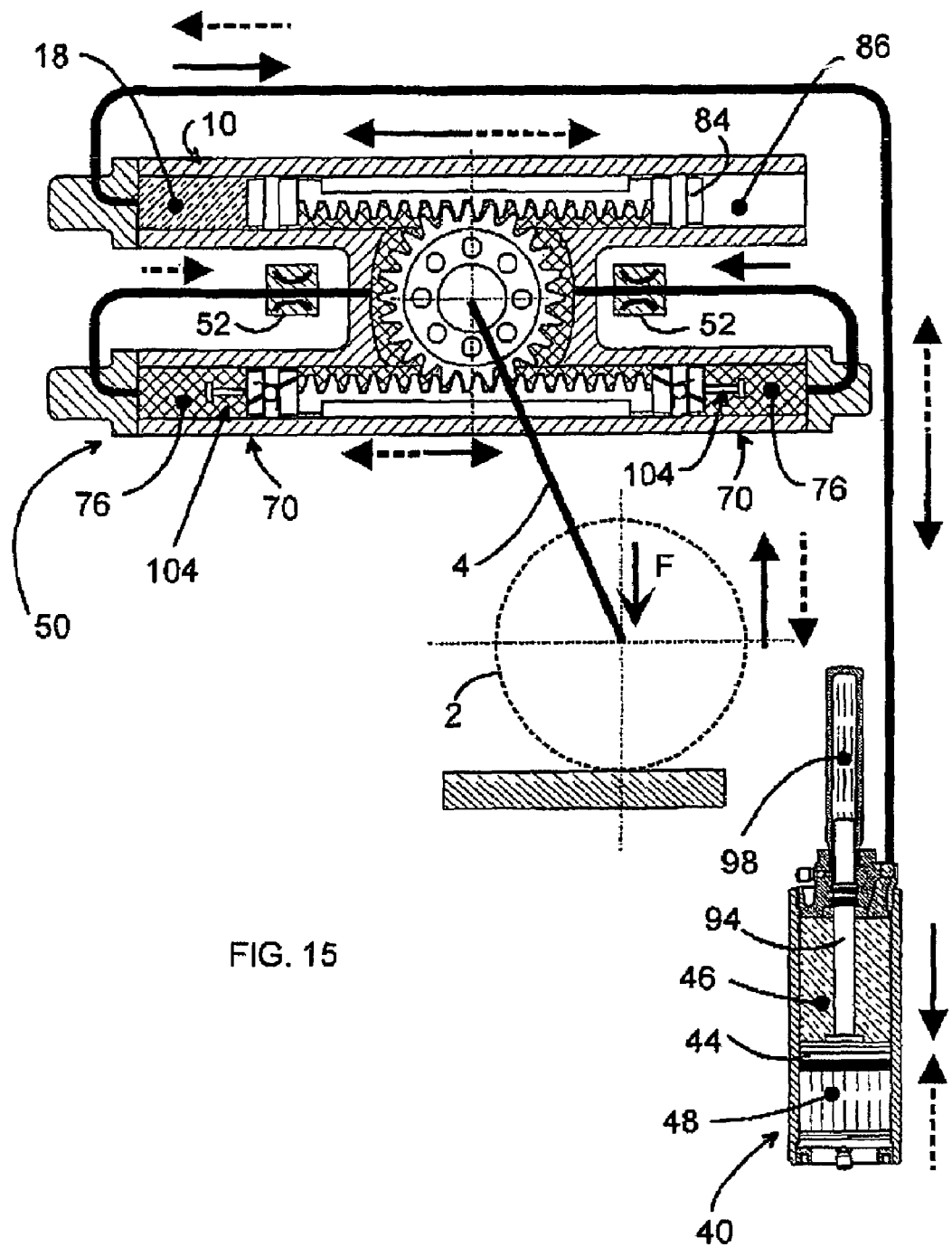

FIG. 15 illustrates this configuration by way of example with the embodiment of the suspension device 1 according to FIG. 11. However, in this case, only each damper cylinder 70 is equipped with a throttle device 104. In both embodiments according to FIGS. 14 and 15, the effect of the end position damping and of the throttle devices 104 can be adapted to the particular compression and rebound conditions. This is expedient since the compression speed is usually higher than the rebound speed of the wheel 2.

Figure 16:
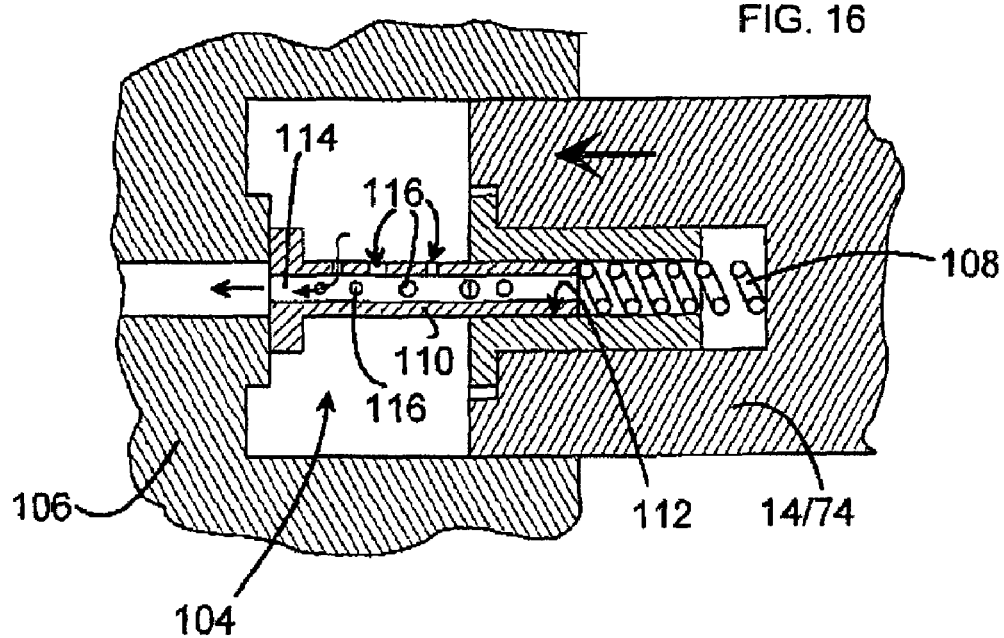
FIG. 16 shows an enlarged sectional view of a detail in the region of an end position damping which is preferably provided.

FIG. 16 illustrates by way of example a structural solution for the throttle device 104. This travel-dependent, hydraulic throttle device 104 may either be fitted into the particular piston 14 or 74 (as illustrated) or else into a closure cover 106 of the particular cylinder. The throttle device 104 has a tappet 110 which can be displaced axially counter to a spring 108 in such a manner that, from a certain position toward the end of the suspension stroke, the tappet enters in the manner of a slide into a guide 112. In this case, the tappet has an axial flow channel 114 into which a plurality of radial transverse openings 116 are distributed over the length opening. The entering of the tappet 110 into the guide 112 enables the transverse openings 116 to be closed successively one after another during the movement into the end stop position. As a result, the flow resistance is successively increased because the hydraulic medium can flow out only via the flow channel 114 of the tappet 110. The particular movement is thereby gently braked and a hard end stop is advantageously avoided.

Figure 17:
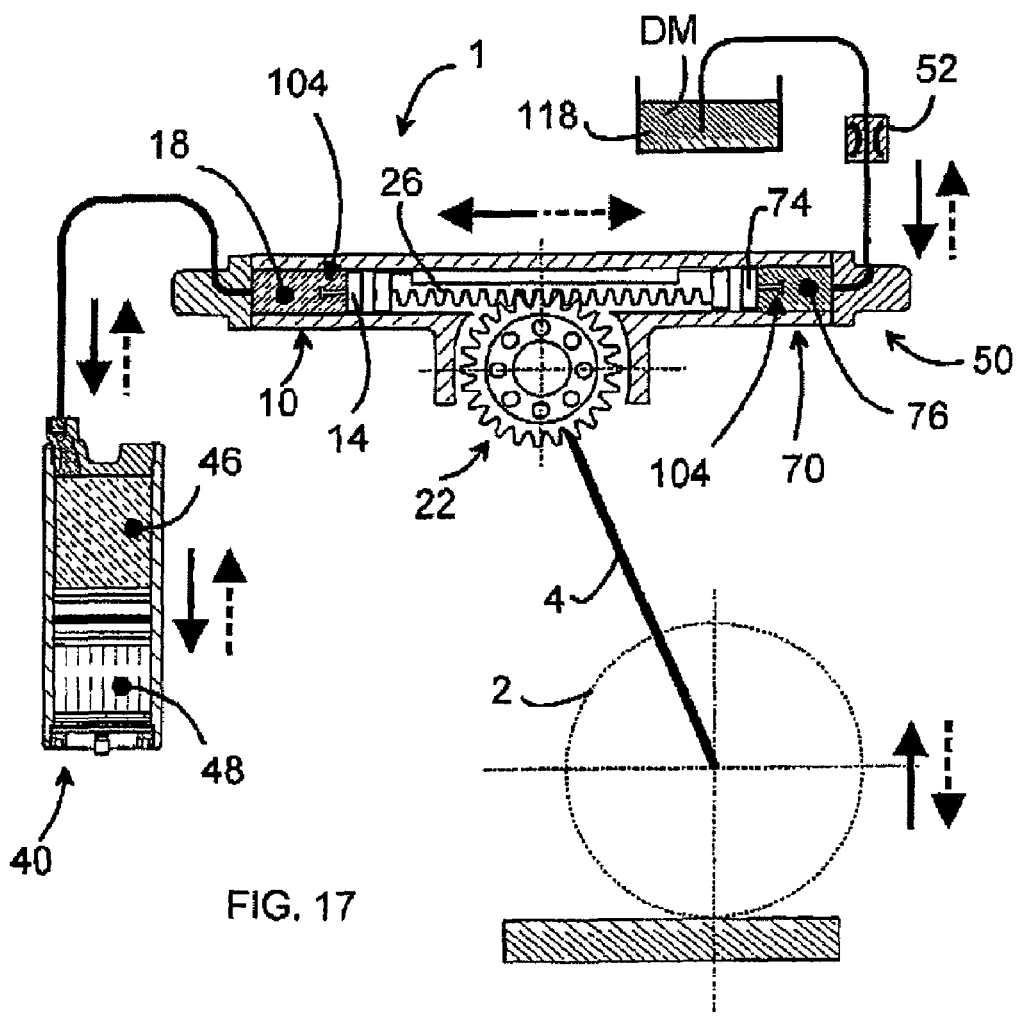
FIGS. 17 to 22 show further variant embodiments of the suspension device according to the invention.

FIG. 17 illustrates a simplified embodiment of the suspension device 1 in which the gearwheel mechanism 22 has only one rack element 26 as defined in FIGS. 1 to 4. In this case, the rack element 26 is connected on one side to the piston 14 of the spring cylinder 10 and on the other side to the damper piston 74 of the damper cylinder 70. The suspension circuit therefore corresponds to the embodiment according to FIG. 3. The damping circuit of the damping device 50 has a tank 118 which is connected to the cylinder space 76 via the damping valve 52 and into which the damping medium DM is displaced during the rebound of the wheel 2 or from which the damping medium DM is sucked during the compression. This embodiment according to FIG. 17 is suitable for suspension tasks in which the spring forces are relatively low.

Figure 18:
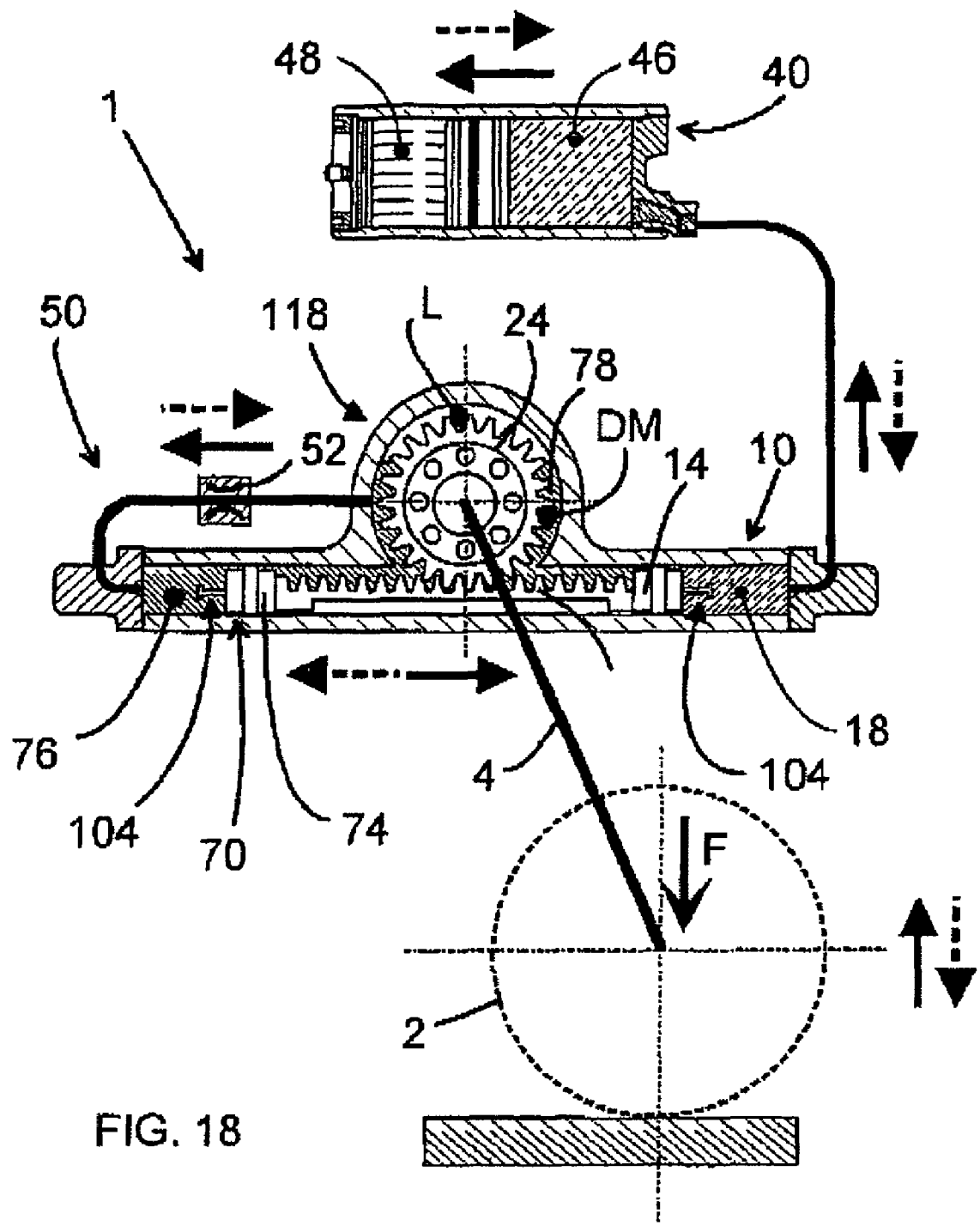

In the case of the embodiment according to FIG. 18, the housing space 78, which accommodates the gearwheel mechanism 22, is used as a tank 118 of the hydraulic circuit of the damping device 50. In this embodiment, the gearwheel element 24 is arranged vertically above the rack element 26, and, within the housing space 78 (tank 118), an air cushion L is contained above the damping medium DM. This corresponds functionally to the embodiments according to FIGS. 12 and 13. The air volume L has to be dimensioned in such a manner that the volume displaced out of the cylinder space 76 plus any possible thermal expansion can be absorbed by the tank 118. Since the gearwheel element 24 is arranged above the rack element 26, the oil level is higher than the cylinder space 76 of the damper cylinder 70. This arrangement enables the damping medium DM to flow better into the cylinder space 76 during an enlargement thereof, than if the tank 118 is arranged below the cylinder space 76, since in this case the medium would have to be sucked up.

Figure 19:
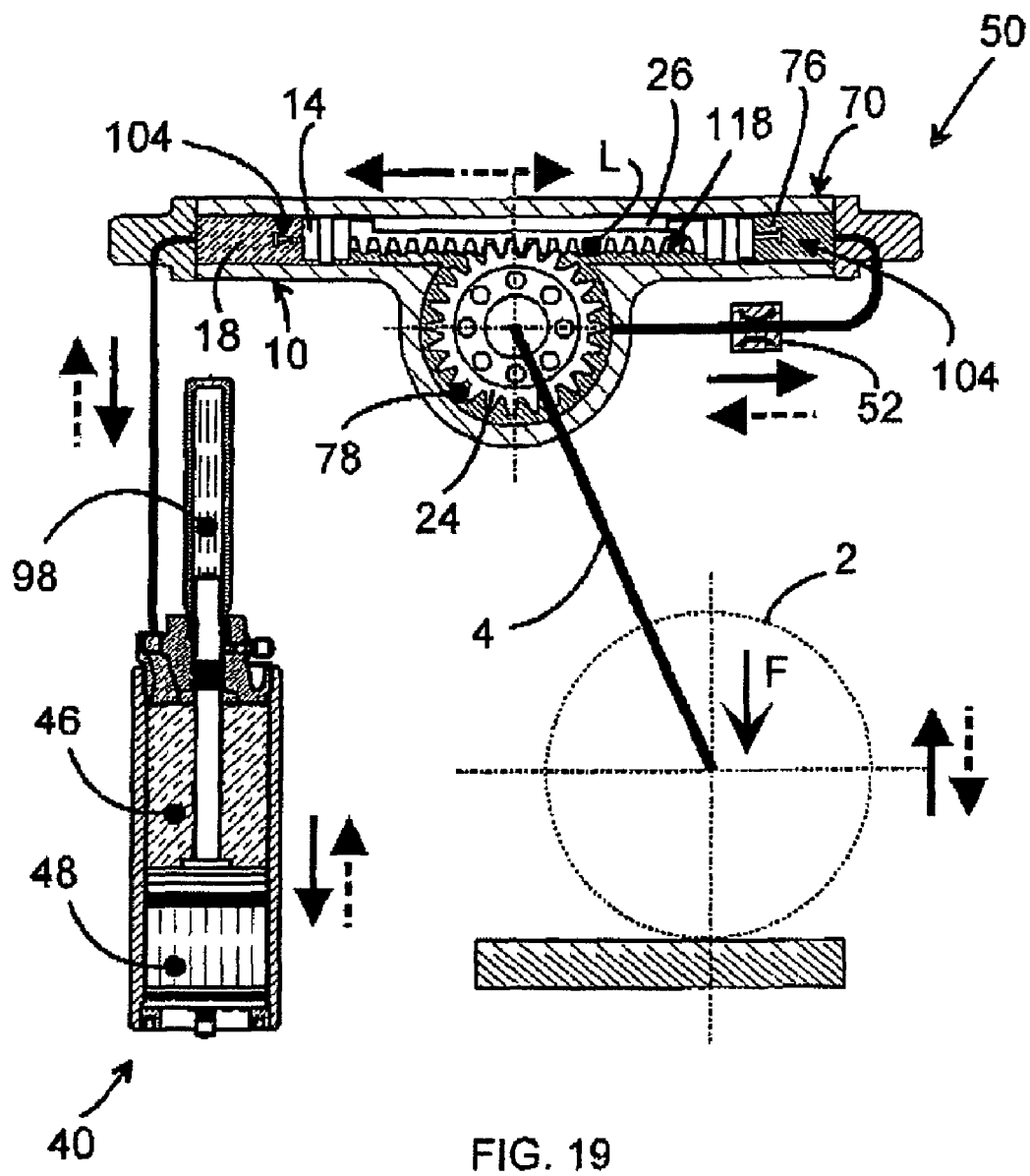

An embodiment of this type is illustrated in FIG. 19. Accordingly, the gearwheel element 24 is arranged vertically below the rack element 26, as a result of which the tank 118 is situated essentially below the cylinder space 76 of the damper cylinder 70 and the damping medium DM therefore has to be sucked up during an enlargement of the cylinder space 76. This can advantageously be assisted by the tank 118 being connected to a pressure store (not illustrated) which sets the tank space under a pressure of, for example approximately 5 bar. In comparison to FIG. 18, the arrangement, provided in FIG. 19, of the gearwheel element 24 on the side on which the wheel 2 is also suspended via the oscillating-crank supporting arm 4 has the advantage of a more favorable distribution of force. In this respect, reference is made again to FIG. 4.

It should be generally noted at this point that the embodiments having two rack elements 26 actually have less significance for relieving the bearing point of the gearwheel element 24 from load. The advantage of the dual rack arrangement resides primarily in the distribution of the hydraulic forces and in the tooth loading, brought about as a result of the toothings of the gearwheel mechanism 22. The embodiments with just one rack element have, above all, the advantage of a very compact constructional form since the space ratios in a vehicle are often restricted such that a somewhat heavier gearwheel element with a heavier rack element can better be accommodated spatially than a dual design in a possibly flatter construction.

Figure 20:
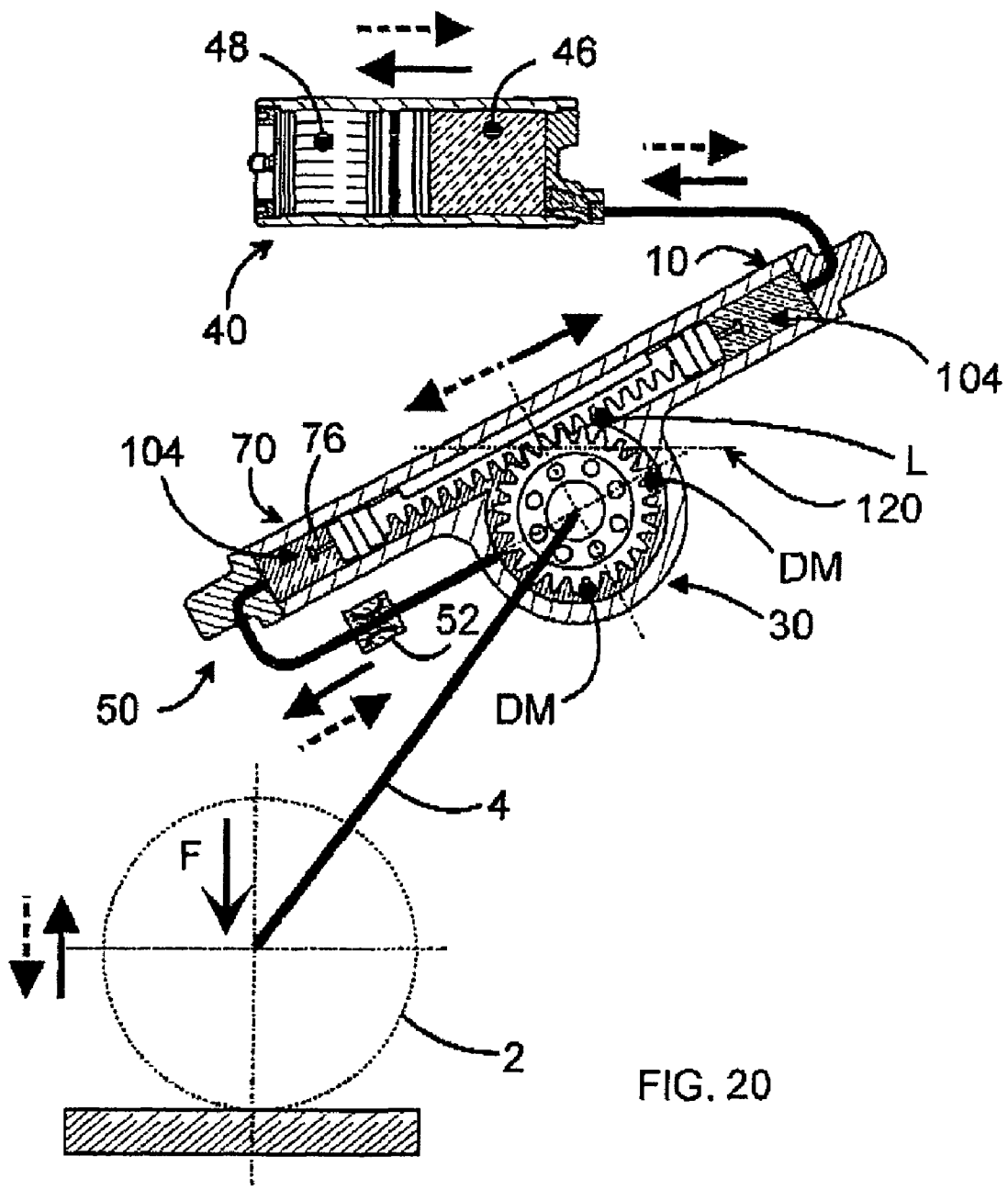

As illustrated in FIG. 20, the embodiment according to FIG. 18 may be arranged, for example, in an installation position which is orientated obliquely such that the damper cylinder 70 together with its cylinder space 76 is in every case always arranged vertically below the line of separation 120 between the damping medium DM and air cushion L. As a result, it is always ensured that the damping medium DM flows into the cylinder space 76 when the latter becomes larger. For cost reasons, this installation position is to be preferred over additional measures if the installation situation in the particular vehicle permits it.

Figure 21:
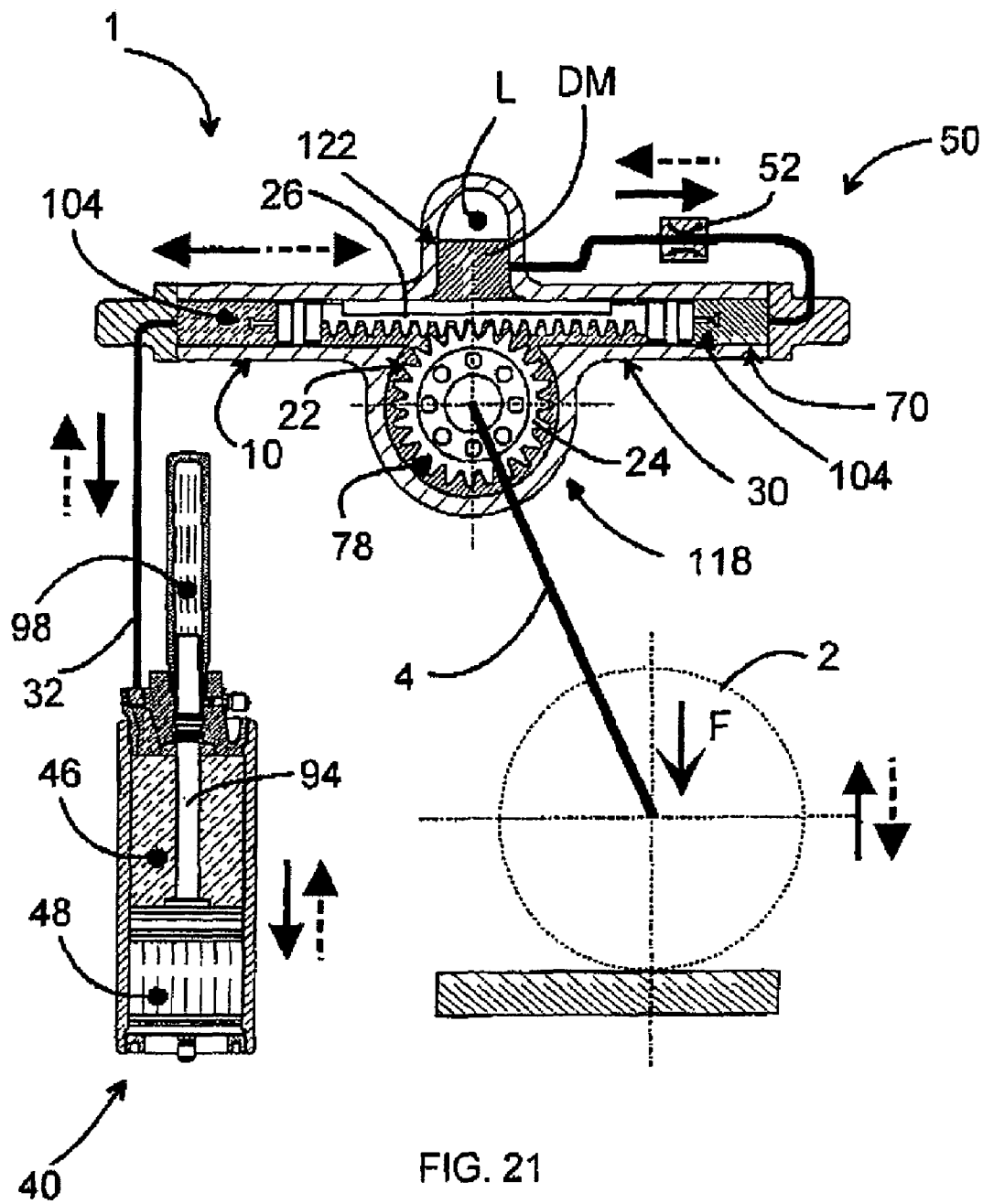

The embodiment according to FIG. 21, which largely corresponds to the embodiment according to FIG. 19, illustrates as an advantageous configuration, the fact that by provision of an additional space 122, the volume of the tank 118 can be enlarged, which is favorable for the thermal economy of the damping medium DM since the larger the volume of the damping medium DM is, the less is it heated. In this case, the additional space 122 is preferably situated vertically above the gearwheel mechanism 22. The additional space 122 can advantageously be formed by an approximately bell-shaped widening of the housing. A further advantage of this configuration is that the entire gearwheel mechanism 22, including the rack element 26, is arranged vertically above the gearwheel element 24 and runs entirely in the oil bath and, as a result, the wear can be reduced.

Figure 22:
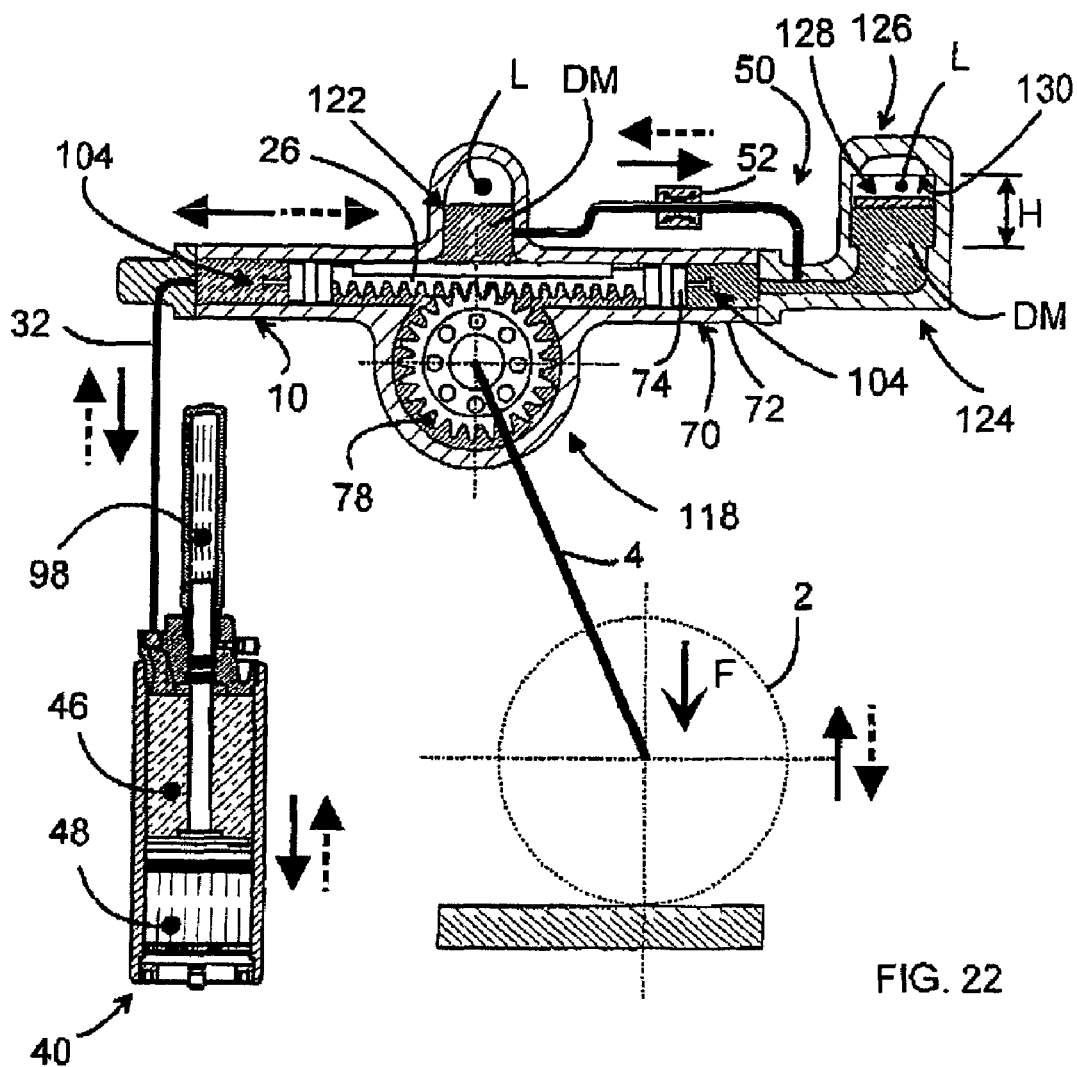

With reference to FIG. 22, an advantageous development, by way of example for the embodiment according to FIG. 21, in the region of the damping device 50 is explained. This concerns an additional device 124 in such a manner that slight suspension movements, to be precise advantageously specifically in the rebound direction, are possible virtually without damping of the damping medium DM while damping automatically starts up only after a certain spring travel. For this purpose, the cylinder space 76 of the damper cylinder 70 is connected directly to a storage space in which a disk-shaped stop element 128 is freely moveable between the damping medium DM and an air cushion L. This stop element 128 floats virtually on the oil level of the damping medium DM. If during a suspension movement damping medium DM flows into the storage space 126, then the rising oil level causes the stop element 128 to be raised toward the air cushion L. However, this movement is limited, in a position corresponding to a certain spring travel, by an inner stop step 130 within the storage space 126.

The significance and working principle of this embodiment are as follows: if the wheel 2 is compressed by a small distance of, for example, approximately 50 mm, then, during this compression, damping is exclusively provided by means of flow losses in the line 32 between the spring cylinder 10 and spring energy store 40. During the compression, the damping device 50 does not have any damping effect. If the wheel 2 subsequently rebounds, then the rack element 26 is pushed in the direction of the cylinder space 46 of the damper cylinder 70 (to the right in FIG. 22). As a result, damping medium DM is displaced out of the cylinder space 76. A corresponding volume flows in the direction of the damping valve 52 and builds up a pressure there. It is therefore easier for the damping medium DM to flow into the additional storage space 126 since this flow is opposed only by a small resistance which results from the stop element 128 being raised toward the air cushion L. The stop element 128 is furthermore raised until it bears against the stop step 130. Up to this position, virtually no damping takes place. If, however, the stop position is reached, then the storage space 126 can no longer absorb any further volume of the damping medium DM. In a more extensive rebound movement, only the route via the damping valve 52 is consequently available to the damping medium DM. Consequently, the damping action starts up.

Figure 23:
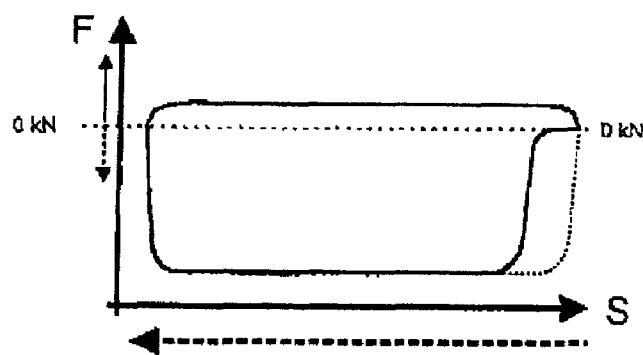
FIG. 23 shows a force/travel diagram for the embodiment according to FIG. 22, FIGS. 24 and 25 show a further embodiment together with an associated diagram analogous to FIGS. 22 and 23.

This modified damping is illustrated in the diagram according to FIG. 23. As can be seen in this diagram, starting from the static position (force=0) there is only a very small damping (line damping) in the compression direction (solid arrows). In the rebound direction (dashed arrow direction) it can be seen, on the right-hand side of the diagram, that first of all there is no damping since the force follows the zero line. Only after a short distance does the damping build up in the rebound direction.

The advantage of this delayed damping is that, in the case of small stroke movements, there is virtually no damping and therefore it is also not possible for any heat to develop through the damping. This advantage becomes noticeable during journeys on relatively smooth roads. In the case of relatively smooth roads, for example freeways, the vehicle suspension very frequently springs in small strokes. This leads to an enormous heating of the damping medium if there is no travel which is free from damping.

It is true that a similar effect could also be achieved by means of other measures, such as for example, by means of a groove-like recess in the cylinder wall in the damper cylinder 70 such that around the static position, there is virtually a bypass around the damper piston 74 and thus a damping action does not arise. However, the previously described solution according to FIG. 22 has the crucial advantage that the damping delay by means of the additional volume can be effective in every position of the rack element. This has an advantageous significance for the situation in which a change in the ride height of the suspension system is provided. If the vehicle is set to a different ride height by the supply of medium, the recess in the damper cylinder 70 would no longer have any effect because of a different relative position of the damper piston 74 or the damping would start up at a wrong position of the wheel stroke. The preferred solution according to FIG. 22 always works, however, during a reversal of the movement from the compression to the rebound.

Figure 24:
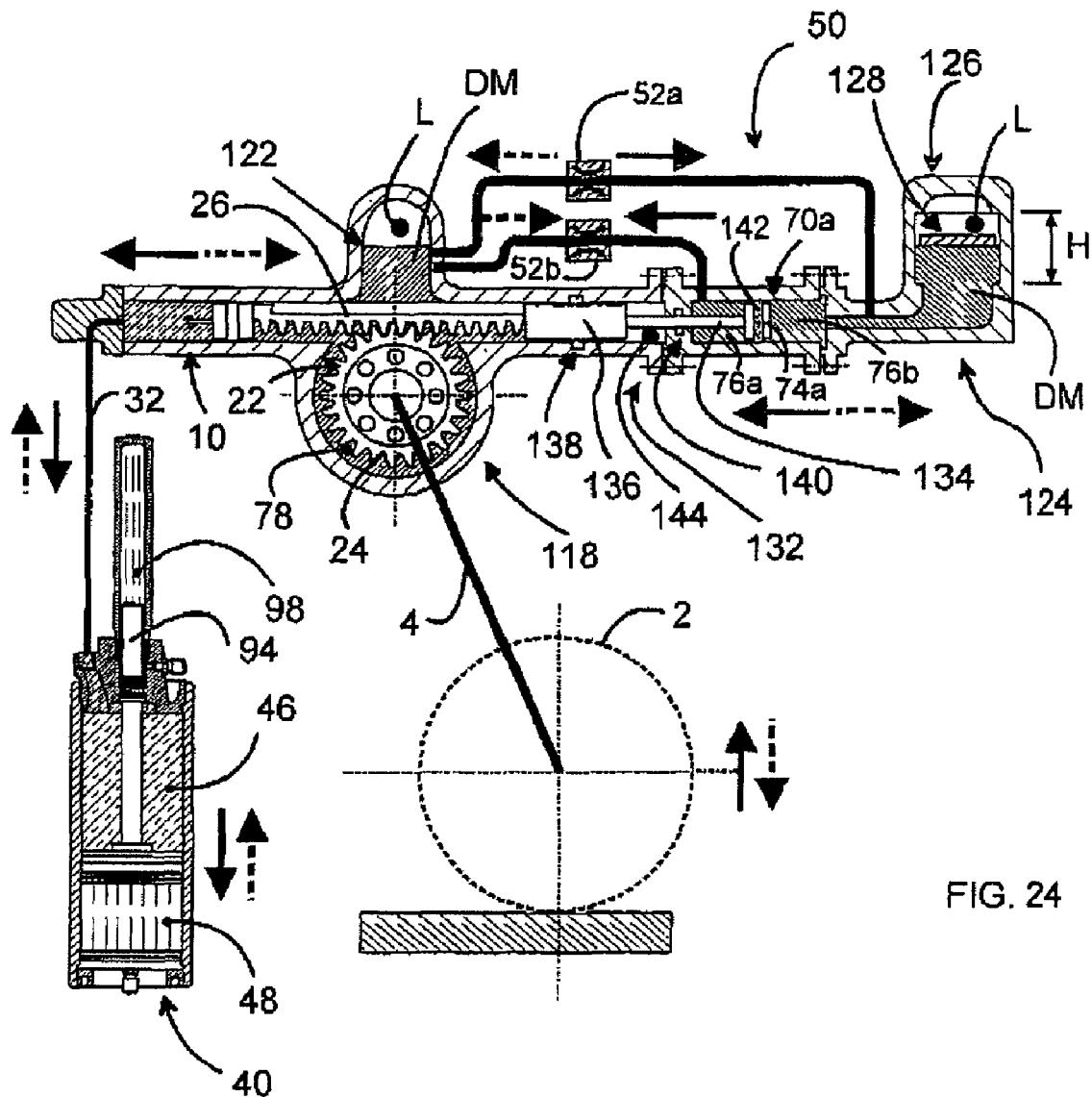

FIG. 24 illustrates a further variant of the damping device 50 which makes it possible also to achieve specific damping in the compression direction, in addition to the line damping between the spring cylinder 10 and spring energy store 40. This is achieved by means of a further additional device 132. For this purpose, the damper cylinder 70a is designed as a double-action cylinder unit by the damping piston 74a separating an annular space 76a from the piston space 76b within the cylinder 72a. The damper piston 74a is connected via a piston rod 134 to a guide piston 136 which, for its part, is connected to the rack element 26 and is therefore displaced in accordance with the suspension movements and, via the piston rod 134, correspondingly moves the damper piston 74a. As the end of the housing space 78 and of the tank 118 are formed therein, the guide piston 136 is sealed off with respect to the housing via a first seal 138. The piston rod 134 is sealed off in the housing via a second seal 140, and the damper piston 74a has a third seal 142 (piston ring). The second seal 140 separates the annular space 76a, which surrounds the piston rod 134 from a chamber 144, which is filled with air and is formed between the first seal 138 and the second seal 140. The piston space 76b is preferably connected to the above-described additional device 124 and to the storage space 126. For damping purposes, the piston space 76b is furthermore connected to the tank 118 via a first damping valve 52a, and the annular space 76a is likewise connected to the tank 118 via a second damping valve 52b.

The first seal 138 ensures that the tank, which is formed in the housing space 78, is not enlarged or reduced by the movements of the rack element 26. Instead, only a change in volume in the region of the chamber 144 occurs, but this is insignificant because of the air contained in it.

Figure 25:
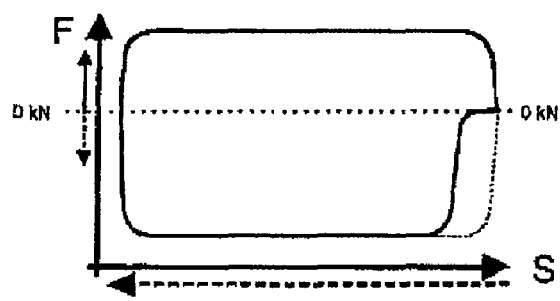

As emerges from the associated diagram of FIG. 25, a certain damping is also achieved in the compression direction by means of this described configuration. In the rebound direction, the damping which starts up with a delay is preferably effective again here corresponding to FIGS. 22 and 23. During the compression, a damping delay is not required since the compression direction is in any case damped a relatively small amount in relation to the rebound, and therefore also correspondingly less heat arises.

Figure 27:
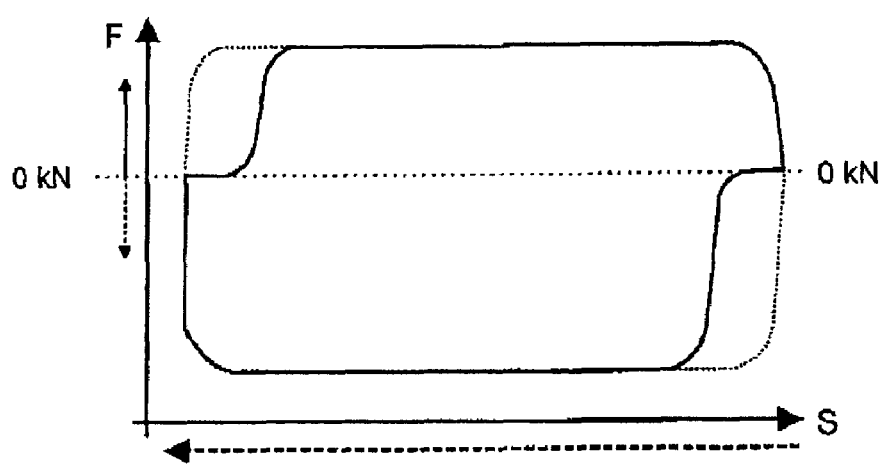
FIG. 27 shows a diagram analogous to FIGS. 23 and 25 for an alternative embodiment (not illustrated) of the suspension device.

It is clear with reference to the diagram in FIG. 27 that also an embodiment, not illustrated, is possible where for particular applications, for example off-road vehicles, the compression direction is damped to a greater extent. In addition, a damping delay may also be installed in the compression direction.

FIGS. 28 and 29 illustrate two exemplary embodiments with a "kinematic reversal" being provided in the region of the cylinders and pistons. This means that one or more of the pistons is supported here in a position in a fixed manner on support elements 148 via one or more piston rods 146 while one or more of the cylinders is driven via the respective rack element 26. FIG. 28 involves an embodiment with just one cylinder/piston unit arranged, in particular, above the gearwheel element 24 while the embodiment according to FIG. 29 illustrates a dual solution.

Figure 30:
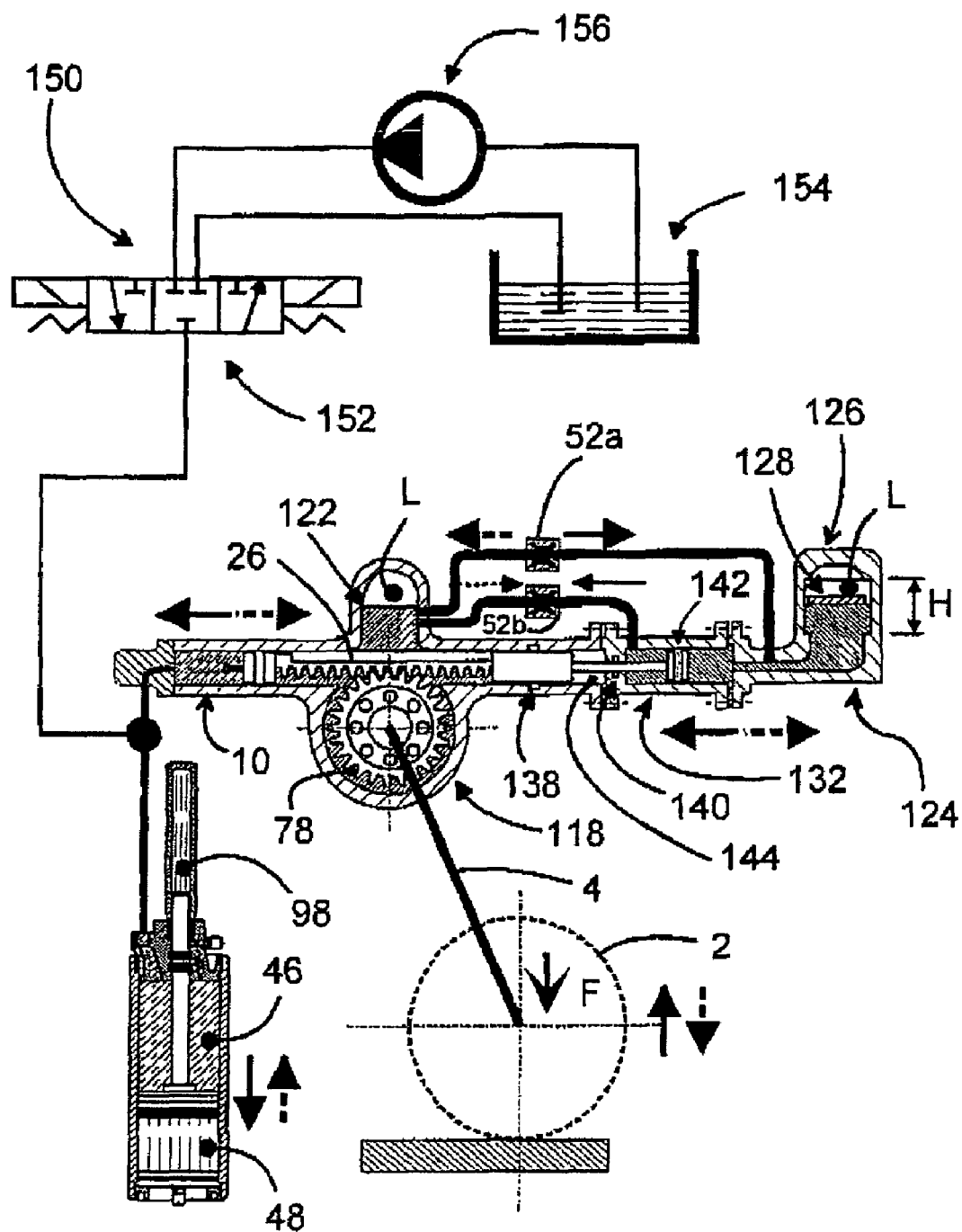
FIG. 30 shows a development based on the embodiment according to FIG. 24 with an additional ride-height-adjusting device.

FIG. 30 illustrates, by way of example with reference to the embodiment according to FIG. 24, that the suspension device 14 may additionally be equipped with a ride-height-adjusting device 150. This ride-height-adjusting device 150 is connected to the suspension circuit in order to be able to supply hydraulic medium for changing the static vehicle ride height, or to be able to let it out. For this purpose, the ride-height-adjusting device 150 comprises a switching valve 152, a tank 154 and a pump 156. The switching valve 152 is designed as a 3/3-way direction or control valve and, in the position illustrated, is closed. In a first switching position, the pump 156 can be connected to the suspension circuit in order to supply hydraulic medium and, as a result, to raise the ride height. In a second switching position, the suspension circuit is connected to the tank 154 in order to let out hydraulic medium to lower the ride height. This change in ride height therefore takes place because the overall weight of the vehicle does not change.

Figure 31:
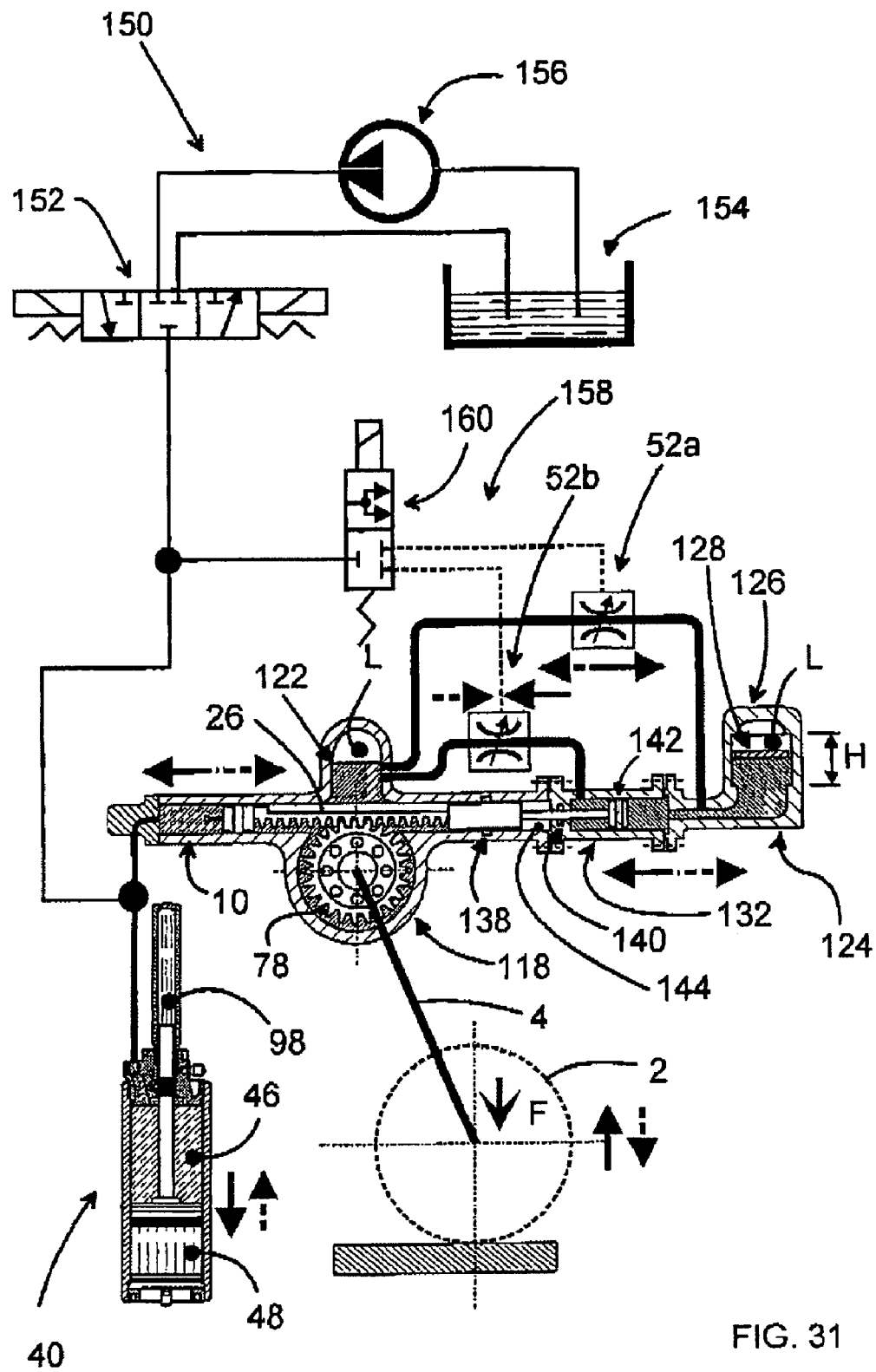
FIG. 31 shows a development of the embodiment according to FIG. 30 with damping which can be adjusted in particular as a function of the load.

Finally, as far as the embodiment according to FIG. 31 is concerned, a device 158 for changing the damping characteristic is provided. In this case, one or more of the damping valves 52 or 52a, can be adjusted in order to change the damping effect and, for this purpose, can be acted on by a control pressure. This control pressure can advantageously be the particular pressure, which is dependent on the load, within the hydraulic spring circuit. This pressure may be temporarily switched to the particular damping valve via a switching valve 160. The effect advantageously achieved by this is that an adaptation of the damping to the particular loading state of the vehicle is possible.

The invention is not restricted to the exemplary embodiments specifically illustrated and described, but also includes all embodiments acting with identical effect within the meaning of the invention. The invention may also be used independently of the gearwheel mechanism and vice versa, but a combination of both measures being particularly advantageous. The different embodiments and the features present in each case may be used in any desired suitable combinations.

While the above description constitutes the preferred embodiment of the present invention, it will be appreciated that the invention is susceptible to modification, variation and change without departing from the proper scope and fair meaning of the accompanying claims.

The invention claimed is:

1. A suspension device for the load-bearing and resilient support of a wheel in a motor vehicle, comprising at least one spring cylinder with a piston which is guided in a manner moveable relative to the piston in a pressure cylinder, a driving device for converting pivoting movements of a wheel oscillating-crank supporting arm, which movements oscillate about an oscillating-crank axis, into relative movements between the pressure cylinder and the piston, the piston acting counter to an elastically compressible spring medium in order to produce a load-bearing supporting spring force, and having a damping device for damping suspension movements wherein the damping device has a separate circuit of a hydraulic damping medium, which circuit is independent of the spring cylinder and the spring medium.

2. The suspension device according to claim 1 wherein the driving device is designed as a gearwheel mechanism.

3. The suspension device according to claim 2 wherein the gearwheel mechanism comprises a gearwheel element, which is connected or can be connected to the oscillating-crank supporting arm and is mounted in a rotating manner about the oscillating-crank axis and has at least a partial peripheral toothing, and a rack element which is connected to the piston or to the pressure cylinder.

4. The suspension device according to claim 2 wherein the gearwheel drive is arranged in a housing space, the housing space being incorporated into the separate circuit of the hydraulic damping medium and, for this purpose, being at least partially filled with the hydraulic damping medium.

5. The suspension device according to claim 1 wherein the damping device has at least one damper cylinder having a damper piston which is guided in a manner moveable relative to the damper piston in the damper cylinder, and at least one damper valve, which is connected hydraulically to the damper cylinder.

6. The suspension device according to claim 5 wherein the spring cylinder, on the one hand, and the damper cylinder, on the other hand, are driven by a common rack element of the gearwheel mechanism.

7. The suspension device according to claim 5 wherein one or more of the spring cylinders is driven by a first rack element and the at least one damper cylinder is driven by a second rack element, the rack elements being arranged essentially parallel to each other on diametrically opposite sides of the gearwheel element of the gearwheel mechanism.

8. The suspension device according to claim 5 wherein a hydraulic end position damping, in particular with at least one travel-dependent, hydraulic throttle device, which is integrated in the spring cylinder or in the damper cylinder, in such a manner that a braking of the suspension movements is ensured in each case toward an end of the movement stroke before a mechanical end stop is reached.

9. The suspension device according to claim 1 wherein the damping device interacts with the same driving device as the spring cylinder.

10. The suspension device according to claim 1 wherein the at least one spring cylinder includes a first spring cylinder and a second spring cylinder, the first and second spring cylinders are driven by the same driving device.

11. The suspension device according to claim 10 wherein the second spring cylinder is driven in a manner acting identically with respect to the first spring cylinder so that the partial supporting forces produced by the first and second spring cylinders add up to form the overall supporting force for the suspension device.

12. The suspension device according to claim 10 wherein the second spring cylinder is driven in each case in an opposed manner with respect to the first spring cylinder, so that the overall supporting force arises from the difference of two partial forces.

13. The suspension device according to claim 1 wherein the spring medium is an elastically compressible liquid, such as includes silicone, having a compressibility of at least 10% by volume, the spring medium being contained directly in one or more of the spring cylinders or in a storage reservoir connected to the spring cylinder.

14. The suspension device according to claim 1 wherein the spring medium is contained as a gas in a hydropneumatic spring energy store, one or more of the spring cylinders acting indirectly counter to the spring medium via a hydraulic medium.

15. The suspension device according to claim 1 wherein at least one damping valve is arranged in the circuit of the hydraulic damping medium.

16. The suspension device according to claim 1 wherein the damping device has two damper cylinders having cylinder spaces which can be changed in volume to the same extent in opposite directions in each case, the hydraulic damping medium in each case flowing between the two cylinder spaces and, in the process, via a damping valve during the suspension movements.

17. The suspension device according to claim 1 wherein the damping device has a tank which is incorporated into the damping circuit.

18. The suspension device according to claim 1 wherein at least one hydropneumatic spring energy store having a freely moveable separating piston which separates a storage space, which is connected hydraulically to the spring cylinder and contains a hydraulic medium, from a spring chamber containing the gaseous spring medium.

19. The suspension device according to claim 18 wherein the separating piston can be acted upon by a counter pressure, on its side facing away from the spring chamber, independently of the pressure of the hydraulic medium.

20. The suspension device according to claim 19 wherein the separating piston has a piston rod which extends axially through the storage space and, in a manner sealed by an intermediate wall, into a pressure space, it being possible for the piston rod to be acted upon by the counter pressure in the pressure space.

21. The suspension device according to claim 1 wherein the damping device has an additional device in such a manner that small suspension movements on both sides of a static position are virtually undamped while damping starts automatically only after a certain spring travel.

22. The suspension device according to claim 1 wherein the damping device causes a damping in a rebound direction and, if appropriate, also in a compression direction.

23. The suspension device according to claim 22 wherein the damping cylinder is designed as a double-action piston/cylinder unit with a first pressure space and a second pressure space, the first and second pressure spaces being connected to a separate damping valve in each case.

24. The suspension device according to claim 1 wherein a hydraulic ride-height-adjusting device changes a static vehicle ride height by feeding hydraulic medium into or letting it out from a spring circuit in fluid communication with the spring cylinder.

25. The suspension device according to claim 1 wherein a device for changing the damping characteristic, it being possible for at least one adjustable damping valve to be briefly acted upon via a switching valve by a load-dependent, control pressure.

* * * * *

UNITED STATES PATENT AND TRADEMARK OFFICE
CERTIFICATE OF CORRECTION

PATENT NO. : 7,392,998 B2  Page 1 of 1
APPLICATION NO. : 10/517807
DATED : July 1, 2008
INVENTOR(S) : Walter Runkel It is certified that error appears in the above-identified patent and that said Letters Patent is hereby corrected as shown below:

On the Title Page, Item (73)

Please replace "Hann" with --Haan--.

Signed and Sealed this

Fourteenth Day of October, 2008

JON W. DUDAS
*Director of the United States Patent and Trademark Office*